(12) United States Patent
Furukawa et al.

(10) Patent No.: US 7,738,990 B2
(45) Date of Patent: Jun. 15, 2010

(54) KNITTING STRUCTURE MODEL GENERATING PROGRAM, KNITTING STRUCTURE MODEL GENERATING DEVICE AND KNITTING STRUCTURE MODEL GENERATING METHOD

(75) Inventors: Takao Furukawa, Osaka (JP); Takayuki Arai, Nagoya (JP); Yasuharu Kase, Nagoya (JP); Kiyoshi Kawarazaki, Anjo (JP)

(73) Assignees: Digital Fashion Ltd. (JP); Toyota Tsusho Corporation (JP)

( * ) Notice: Subject to any disclaimer, the term of this patent is extended or adjusted under 35 U.S.C. 154(b) by 0 days.

(21) Appl. No.: 12/226,645

(22) PCT Filed: Apr. 17, 2007

(86) PCT No.: PCT/JP2007/058326

§ 371 (c)(1),
(2), (4) Date: Oct. 23, 2008

(87) PCT Pub. No.: WO2007/125780

PCT Pub. Date: Nov. 8, 2007

(65) Prior Publication Data

US 2009/0171496 A1 Jul. 2, 2009

(30) Foreign Application Priority Data

Apr. 25, 2006 (JP) ............................. 2006-121365

(51) Int. Cl.
*G06F 19/00* (2006.01)
(52) U.S. Cl. ........................................ 700/141; 66/238
(58) Field of Classification Search ................ 700/141, 700/138; 66/238
See application file for complete search history.

(56) References Cited

U.S. PATENT DOCUMENTS 5,719,777 A * 2/1998 Kotaki ........................ 700/131
5,812,110 A * 9/1998 Kawasaki et al. ........... 700/141

(Continued)

FOREIGN PATENT DOCUMENTS

| JP | 9-212664 | 8/1997 |
| WO | WO 03/032204 A1 | 4/2003 |

OTHER PUBLICATIONS

M. Meissner et al.—"The Art of Knitted Fabrics, Realistic & Physically Based Modelling of Knitted Patterns"—Computer Graphics Forum, Blackwell Publishing, Sep. 1998, vol. 17, Issue 3, pp. 355-362.

*Primary Examiner*—Danny Worrell
(74) *Attorney, Agent, or Firm*—Gerald E. Hespos; Michael J. Porco

(57) ABSTRACT

A knitting structure model is generated from knitting structure data represented by specific symbols so that an individual can easily imagine what type of knit fabric will be knitted. A knitting structure data acquiring portion (11) acquires knitting structure data made up of symbols (T) representing a tuck, (W) representing a welt, and (K) representing a knit. A node aligning portion (12) aligns nodes representing connecting points of yarns forming the knit fabric within the (XY) plane in a lattice form. A simplified model generating portion (13) generates a simplified knitting structure model by connecting the nodes aligned within the XY plane with edges corresponding to the yarns according to the knitting structure data. A display portion (40) displays the simplified knitting structure model thereon.

13 Claims, 25 Drawing Sheets

U.S. PATENT DOCUMENTS

| | | | |
|---|---|---|---|
| 6,611,730 B1 * | 8/2003 | Stoll et al. | 700/131 |
| 6,845,284 B2 * | 1/2005 | Bingham et al. | 700/141 |
| 7,203,566 B2 * | 4/2007 | Terai et al. | 700/141 |
| 7,386,360 B2 * | 6/2008 | Noriyuki | 700/131 |
| 7,460,927 B1 * | 12/2008 | Lai | 700/141 |

* cited by examiner

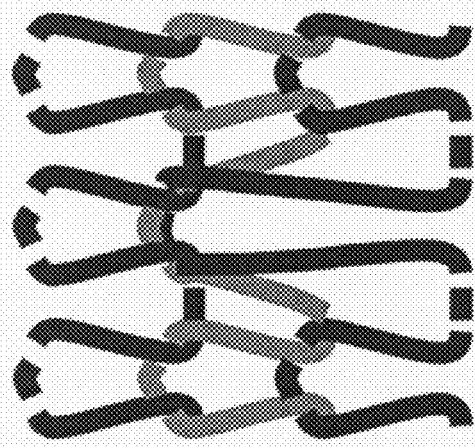
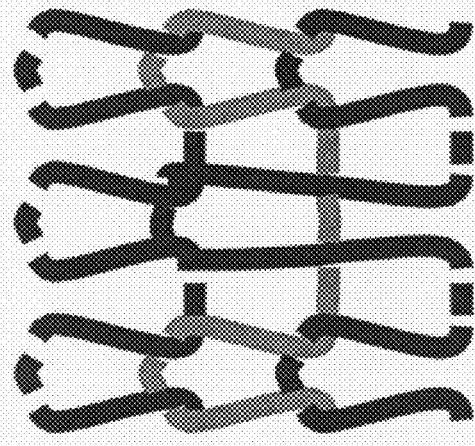
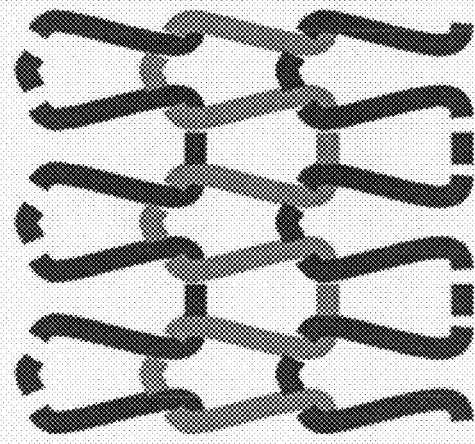

FIG. 5A kKk
kKk
kKk

FIG. 5B kKk
kWk
kKk

FIG. 5C kKk
kTk
kKk

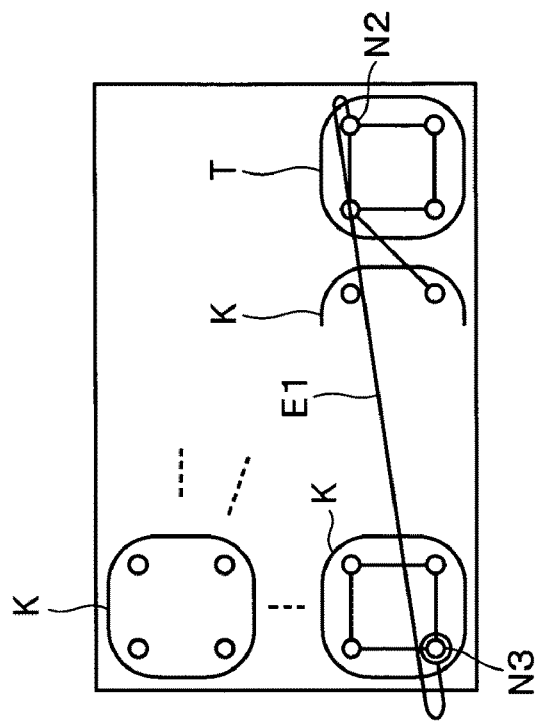
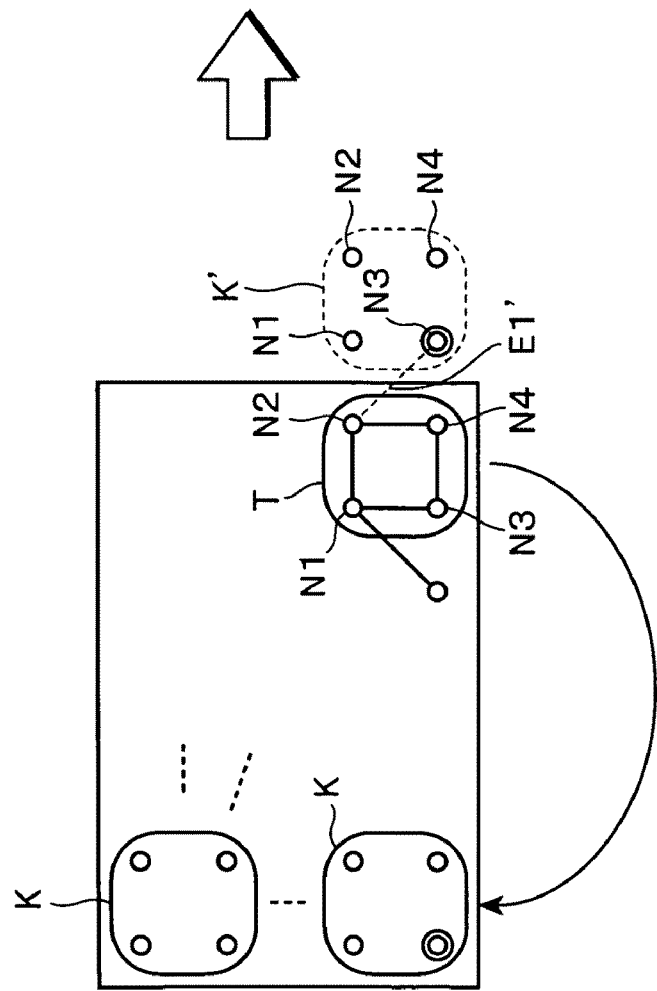
FIG. 26B
FIG. 26A

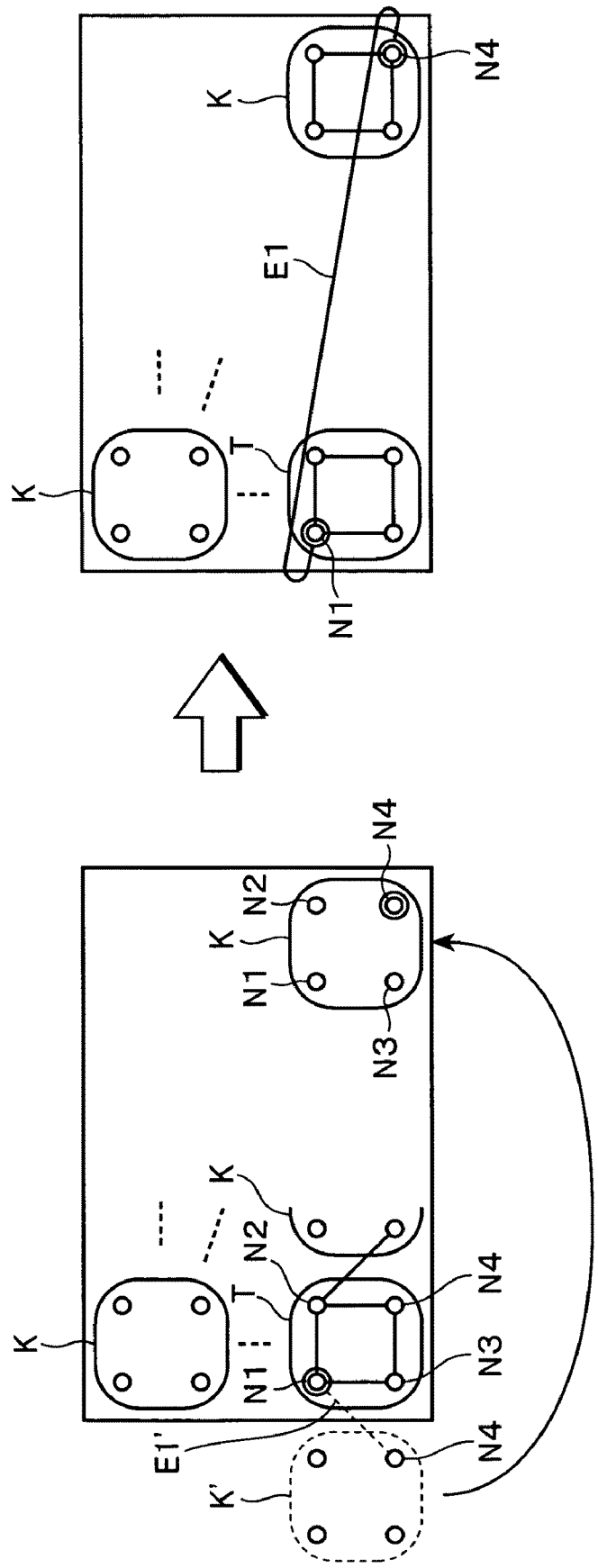

KNITTING STRUCTURE MODEL GENERATING PROGRAM, KNITTING STRUCTURE MODEL GENERATING DEVICE AND KNITTING STRUCTURE MODEL GENERATING METHOD

BACKGROUND OF THE INVENTION

1. Field of the Invention

The present invention relates to a technique of generating a knitting structure model of a knit fabric within a virtual three-dimensional space created on a computer.

2. Description of the Related Art

A knit fabric is formed by combining several knitting patterns, such as a tuck and a knit. Accordingly, it is conventional to assign symbols representing the respective knitting patterns and to express the structure of a knit fabric by aligning these symbols. Symbols known as those representing basic knitting patters are, for example, a list of the knitting stitch symbols specified by the Japanese Industrial Standards (JIS). WO 03/032204 discloses a technique by which a two-dimensional image is generated by choosing images of knitting stitches prepared in modular forms from the library and multiple layers are laminated using the two-dimensional image as one layer so as to simulate a knit fabric.

However, to imagine what type of knit fabric will be knitted from the knitting stitch symbols requires considerable experiences and knowledge, and it is difficult to exert imagination unless an individual is well experienced in knit fabrics. Also, the technique of Patent Document 1 is merely to choose images of knitting stitches prepared in modular forms from the library, and WO 03/032204 fails to run a simulation that includes and considers physical characteristics applied to every single yarn. It is therefore impossible to generate a realistic knitting structure model.

SUMMARY OF THE INVENTION

An object of the invention is to provide a knitting structure model generating program, a knitting structure model generating device, and a knitting structure model generating method for generating a knitting structure model from knitting structure data in which knitting patterns of yarns forming the knit fabric are represented by specific symbols so that an individual can easily imagine what type of knit fabric will be knitted.

A computer-readable recording medium which stores a knitting structure model generating program according to one aspect of the invention is a knitting structure model generating program for generating a knitting structure model of a knit fabric within a virtual three-dimensional space, said program causing a computer to function as at least: knitting structure data acquiring means for acquiring knitting structure data in which a knitting structure of the knit fabric is represented by symbols corresponding to knitting patterns making up the knitting structure; node aligning means for aligning nodes representing connecting points of yarns forming the knit fabric in a lattice form on a specific plane within the virtual three-dimensional space; and simplified model generating means for generating a simplified knitting structure model by connecting the nodes aligned within the virtual three-dimensional space with edges corresponding to the yarns according to the knitting structure data acquired by the knitting structure data acquiring means.

A knitting structure model generating device according to second aspect of the invention is a knitting structure model generating device that generates a knitting structure model of a knit fabric within a virtual three-dimensional space, including: a knitting structure data acquiring portion for acquiring knitting structure data in which a knitting structure of the knit fabric is represented by symbols corresponding to knitting patterns making up the knitting structure; a node aligning portion for aligning nodes representing connecting points of yarns forming the knit fabric in a lattice form on a specific plane within the virtual three-dimensional space; and a simplified model generating portion for generating a simplified knitting structure model by connecting the nodes aligned within the virtual three-dimensional space with edges corresponding to the yarns according to the knitting structure data acquired by the knitting structure data acquiring portion.

A knitting structure model generating method according to third aspect of the invention is a knitting structure model generating method of generating a knitting structure model of a knit fabric within a virtual three-dimensional space, said method comprising the steps of: obtaining knitting structure data by a computer in which a knitting structure of the knit fabric is represented by symbols corresponding to knitting patterns making up the knitting structure; aligning by the computer nodes representing connecting points of yarns forming the knit fabric in a lattice form on a specific plane within the virtual three-dimensional space; and generating by the computer a simplified knitting structure model by connecting the nodes aligned within the virtual three-dimensional space with edges representing connection relations among the nodes according to the knitting structure data that has been acquired.

According to these configurations, a simplified knitting structure model is generated by obtaining the knitting structure data in which the knitting patterns are represented by specific symbols and connecting the nodes aligned within the specific plane in the virtual three-dimensional space with the edges corresponding to the yarns according to the knitting structure data.

Accordingly, it is possible to obtain the simplified knitting structure model that expresses the knitting structure data by the edges and the nodes. The user who views the simplified knitting structure model can therefore easily imagine what type of knit fabric will be knitted.

A computer-readable recording medium which stores a knitting structure model generating program according to fourth aspect of the invention is a knitting structure model generating program for generating a knitting structure model of a knit fabric within a virtual three-dimensional space, causing a computer to function as at least: simplified model obtaining means for obtaining a simplified knitting structure model in which nodes representing connecting points of yarns forming the knit fabric are aligned in a lattice form on a specific plane within the virtual three-dimensional space and the respective nodes are connected with edges corresponding to the yarns; and solid model generating means for generating a solid knitting structure model by solving a motion equation of each node by finding stress acting on each node making up the simplified knitting structure model on a basis of the edges making up the simplified knitting structure model obtained by the simplified knitting structure model obtaining means and applying a specific external force on each node in a direction crossing an alignment plane of each node.

A knitting structure model generating device according to fifth aspect of the invention is a knitting structure model generating device that generates a knitting structure model of a knit fabric within a virtual three-dimensional space, including: a simplified model obtaining portion for obtaining a simplified knitting structure model in which nodes representing connecting points of yarns forming the knit fabric are aligned in a lattice form on a specific plane within the virtual three-dimensional space and the respective nodes are connected with edges corresponding to the yarns; and a solid model generating portion for generating a solid knitting structure model by solving a motion equation of each node by finding stress acting on each node on a basis of the edges making up the simplified knitting structure model obtained by the simplified knitting structure model obtaining portion and applying a specific external force on each node in a direction crossing an alignment plane of each node.

A knitting structure model generating method according to sixth aspect of the invention is a knitting structure model generating method of generating a knitting structure model of a knit fabric within a virtual three-dimensional space, said method comprising the steps of: obtaining by a computer a simplified knitting structure model in which nodes representing connecting points of yarns forming the knit fabric are aligned in a lattice form on a specific plane within the virtual three-dimensional space and the respective nodes are connected with edges corresponding to the yarns; and generating by the computer a solid knitting structure model by solving a motion equation of each node by finding stress acting on each node on a basis of the edges and applying a specific external force on each node in a direction crossing an alignment plane of each node.

According to these configurations, the solid knitting structure model of the knit fabric is generated by solving the motion equation of each node on the assumption that each node is the mass point of the knit fabric by letting stress corresponding to the kinds of the edges connected to each node act and applying a specific external force on each node. It is thus possible to obtain the solid knitting structure model that includes and considers the mechanical characteristic of the knit fabric. Herein, because the specific external force acts in a direction crossing the alignment plane of the node, the node is allowed to move with ease in the direction crossing the alignment plane, which makes it possible to express the knitting patterns of yarns better in a solid form.

BRIEF DESCRIPTION OF THE DRAWINGS

FIG. 4 is a view schematically showing the knitting structure of a knit fabric; FIG. 4A shows the knitting structure made up of the knitting pattern of a knit alone, FIG. 4B shows the knitting structure in which the knitting pattern of a welt is aligned at the center; and FIG. 4C shows the knitting structure in which the knitting pattern of a tuck is aligned at the center.

FIG. 5A through FIG. 5C are views showing the knitting structure data corresponding to FIG. 4A through FIG. 4C, respectively.

FIG. 21 is a view showing movements of nodes of the welt to the initial positions.

FIG. 22 is a view showing movements of nodes of the tuck to initial values.

FIG. 26A and FIG. 26B are views showing the connection of nodes in a case where a tuck is present on the right end.

FIG. 27A and FIG. 27B are views showing the connection of nodes in a case where a tuck is present on the left end.

DETAILED DESCRIPTION OF THE PREFERRED EMBODIMENTS

Figure 1:
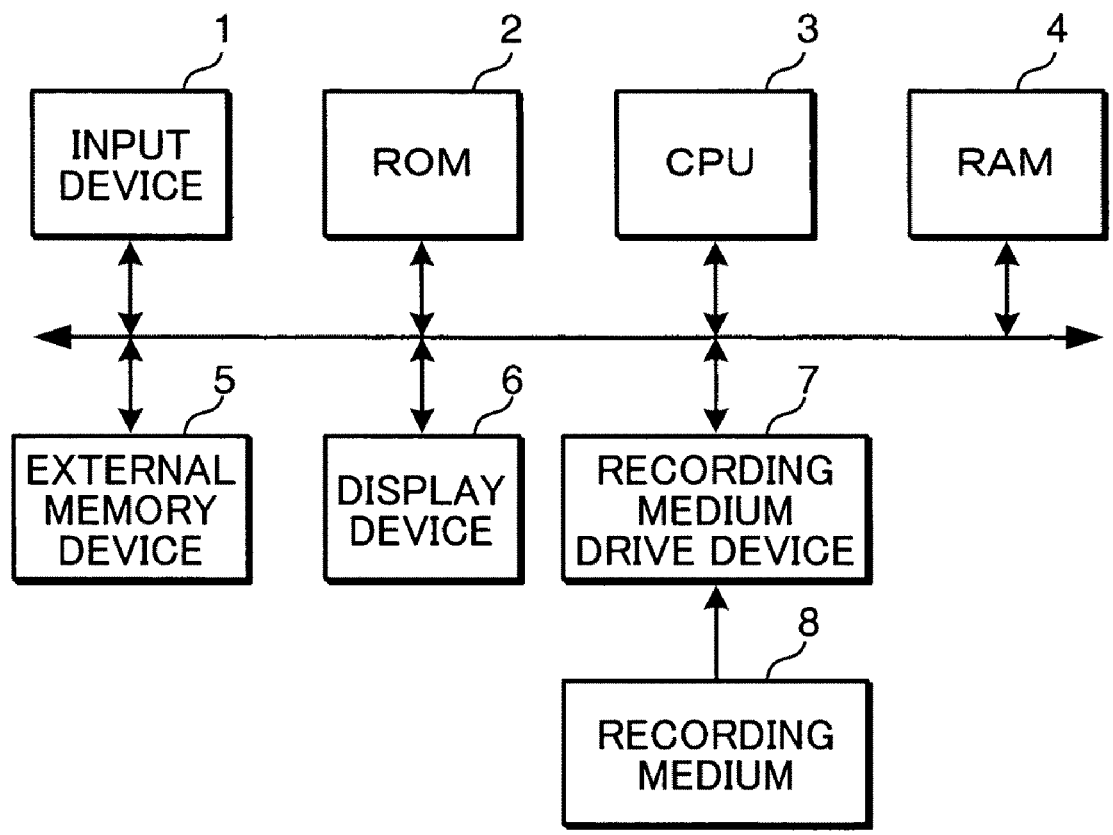
FIG. 1 is a block diagram showing the hardware configuration of a knitting structure model generating device according to one embodiment of the invention.

Hereinafter, one embodiment of the invention will be described with reference to the drawings. FIG. 1 is a block diagram showing the hardware configuration of a knitting structure model generating device according to one embodiment of the invention. The knitting structure model generating device is formed of a typical computer or the like and includes an input device 1, a ROM (Read Only Memory) 2, a CPU (Central Processing Unit) 3, a RAM (Random Access Memory) 4, an external memory device 5, a display device 6, and a recording medium drive device 7. Each block is connected to an internal bus and various kinds of data are inputted and outputted via this bus for various kinds of processing to be performed under the control of the CPU 3.

The input device 1 is formed of a keyboard, a mouse, and the like and used by the user when he inputs various kinds of data. The ROM 2 has stored therein a system program, such as BIOS (Basic Input/Output System). The external memory device 5 is formed of a hard disk drive or the like and has stored therein a specific OS (Operating System), a knitting structure model generating program, and so forth. The CPU 3 reads out the knitting structure model generating program or the like from the external memory device 5 and controls the operations of the respective blocks. The RAM 4 is used as a work area or the like of the CPU 3.

The display device 6 is formed of a liquid crystal display device or the like and displays thereon various images under the control of the CPU 3. The recording medium drive device 7 is formed of a CD-ROM drive, a flexible disk drive, and so forth.

The knitting structure model generating program is distributed in the market by being stored in a computer-readable recording medium 8, such as a CD-ROM. The user installs the knitting structure model generating program into the computer by reading the recording medium 8 by means of the recording medium drive device 7. Alternatively, the knitting structure model generating program may be stored in a server on the Internet, so that the user installs the knitting structure model generating program into the computer by downloading the knitting structure model generating program from this server.

Figure 2:
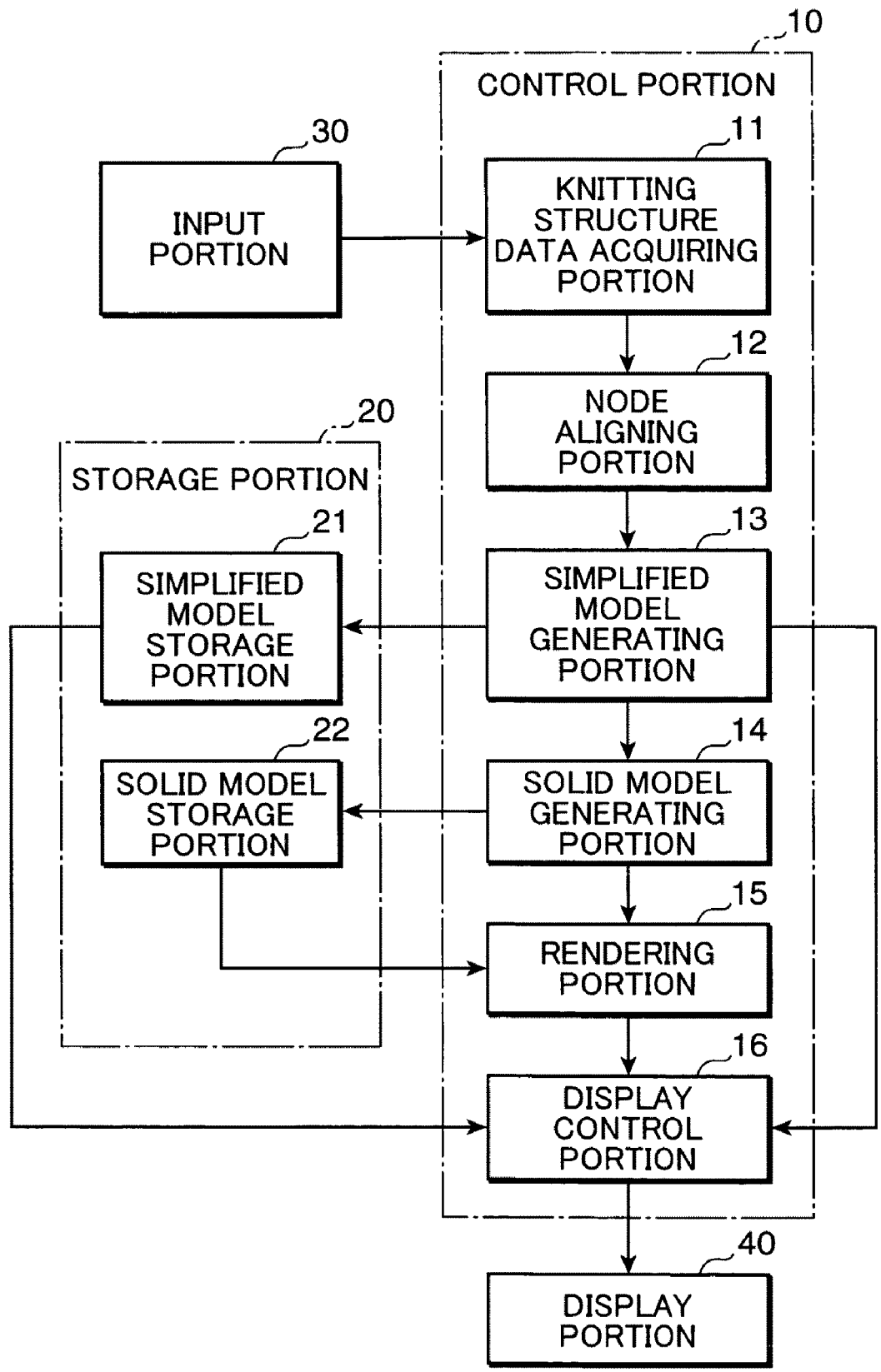
FIG. 2 is a functional block diagram of the knitting structure model generating device.

FIG. 2 is a functional block diagram of the knitting structure model generating device. The knitting structure model generating device includes a control portion 10, a storage portion 20, an input portion 30, and a display portion 40. The control portion 10 is formed of the CPU 3 or the like and furnished with functions of a knitting structure data acquiring portion 11, a node aligning portion 12, a simplified model generating portion 13, a solid model generating portion 14, a rendering portion 15, and a display control portion 16. These functions are achieved as the CPU 3 runs the knitting structure model generating program.

The knitting structure data acquiring portion 11 acquires knitting structure data that is inputted as the user operates the input portion 30. The knitting structure data referred to herein is the data in which symbols pre-assigned to knitting patterns making up the knitting structure of a knit fabric are aligned in a matrix of a certain number of rows×a certain number of columns. As the knitting structure of a knit fabric, the knitting structure of a knit fabric of double sided knitting formed of the front and the back is adopted in this embodiment. Also, three patterns including a knit, a welt, and a tuck are adopted as the knitting patterns. The knitting patterns of the knit, the welt, and the tuck placed on the front are represented by symbols, "K", "W", and "T", respectively. The knitting patterns of the knit, the welt, and the tuck placed on the back are represented by symbols, "k", "w", and "t", respectively.

The node aligning portion 12 aligns nodes in a lattice form within a specific plane in a virtual three-dimensional space according to the number of rows and the number of columns in the knitting structure data acquired by the knitting structure data acquiring portion 11. Nodes referred to herein mean connecting points of yarns forming the knitting pattern.

Also, the node aligning portion 12 aligns nodes within a specific plane in such a manner that four nodes are allocated to one symbol representing a knitting pattern. Herein, of the four nodes allocated to a given symbol, the node on the upper left is referred to as a first node, the node on the upper right is referred to as a second node, the node on the lower left is referred to as a third node, and the node on the lower right is referred to as a fourth node.

Further, the node aligning portion 12 aligns the third and fourth nodes allocated to a given symbol in common, respectively, with the first and second nodes allocated to another symbol positioned adjacently on the lower side of the firstly-mentioned symbol. Accordingly, the number of nodes aligned in the longitudinal direction within a specific plane is equal to the number of rows in the knitting structure data, and the number of nodes in the lateral direction is twice as large as the number of columns in the knitting structure data. The reason why the number of nodes in the longitudinal direction becomes equal to the number of rows in the data is because the respective nodes positioned on the upper end are common with the nodes positioned on the lower end in the same column.

The simplified model generating portion 13 generates a simplified knitting structure model by connecting the respective nodes aligned by the node aligning portion 12 with edges corresponding to yarns according to a node connection rule preliminary determined for each knitting pattern. The simplified knitting structure model thus generated is stored in a simplified model storage portion 21 when the necessity arises.

The solid model generating portion 14 generates a solid knitting structure model by solving a motion equation of each node on the assumption that each of the nodes forming the simplified knitting structure model generated by the simplified model generating portion 13 is a mass point of the knit fabric by letting a specific external force act on each node and finding stress acting on each node from the connection relations of the respective nodes. The solid knitting structure model thus generated is stored in a solid model storage portion 22 when the necessity arises.

The rendering portion 15 renders the solid knitting structure model generated by the solid model generating portion 14 or the solid knitting structure model stored in the solid model storage portion 22. The display control portion 16 displays the simplified knitting structure model generated by the simplified model generating portion 13 or the simplified knitting structure model stored in the simplified model storage portion 21 on the display portion 40. The display control portion 16 also displays the solid knitting structure model rendered by the rendering portion 15 on the display portion 40.

The storage portion 20 is formed of the external memory device 5 shown in FIG. 1 or the like and includes the simplified model storage portion 21 and the solid model storage portion 22. The simplified model storage portion 21 stores therein the simplified knitting structure model generated by the simplified model generating portion 13. The solid model storage portion 22 stores therein the solid knitting structure model generated by the solid model generating portion 14.

The input portion 30 is formed of the input device 1 shown in FIG. 1 or the like and used when the user inputs the knitting structure data. The display portion 40 is formed of the display device 6 shown in FIG. 1 and displays thereon the simplified knitting structure model and the rendered solid knitting structure model under the control of the display control portion 16.

Figure 3:
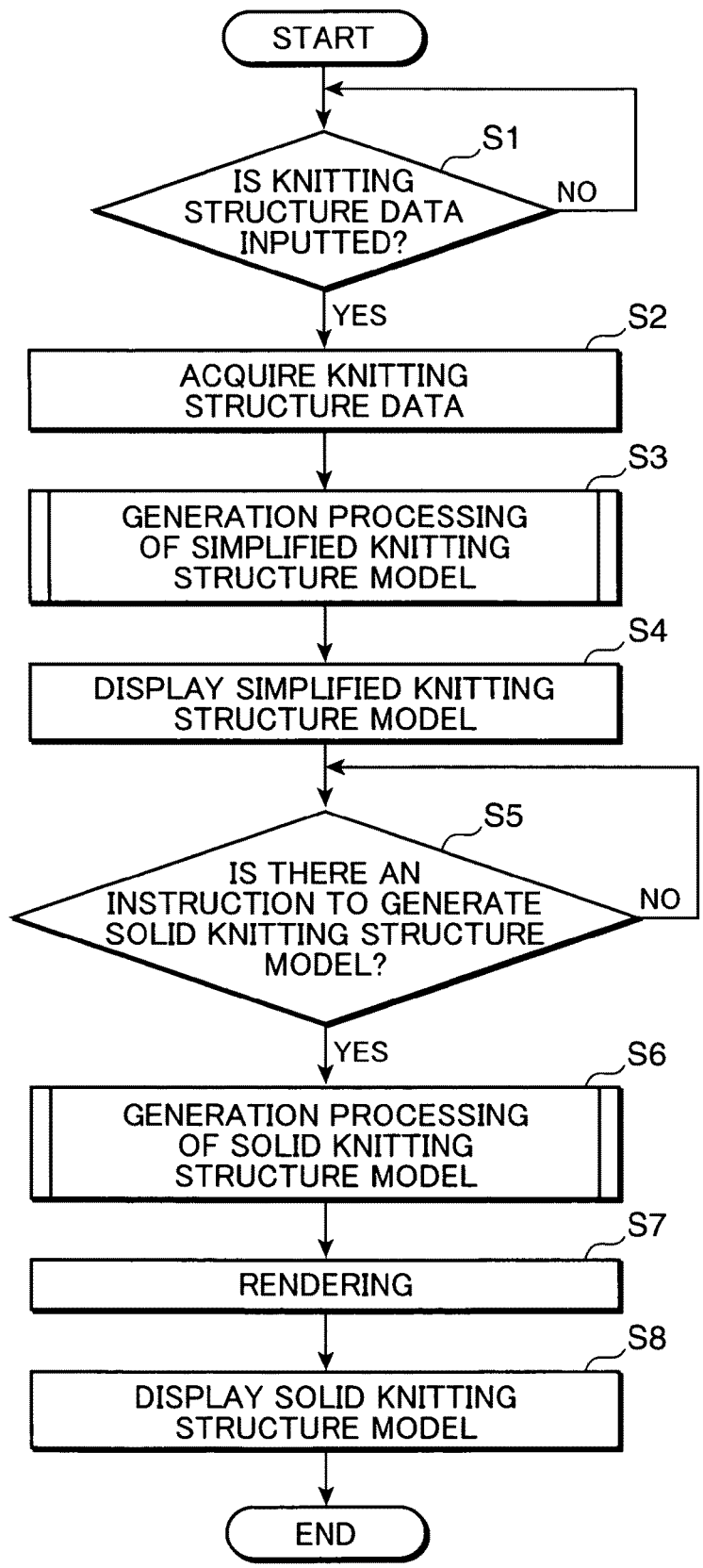
FIG. 3 is a flowchart showing the main routine of the knitting structure model generating device.

Operations of the knitting structure model generating device will now be described. FIG. 3 is a flowchart showing the main routine of the knitting structure model generating device. Initially, in Step S1, the knitting structure data is inputted by the user as he operates the input portion 30 (YES in S1), and the knitting structure data acquiring portion 11 acquires the knitting structure data inputted in the input portion 30. Meanwhile, in a case where the knitting structure data has not been inputted in the input portion 30 by the user (NO in S1), the flow returns to the processing in Step S1.

FIG. 4 is a view schematically shows the knitting structure of a knit fabric. FIG. 4A shows the knitting structure formed of a knitting pattern of the knit alone. FIG. 4B shows the knitting structure in which a knitting pattern of the welt is aligned at the center. FIG. 4C shows the knitting structure in which a knitting pattern of the tuck is aligned at the center. In FIG. 4A through FIG. 4C, the view in the top row shows the knitting structure when viewed from the front and the view in the bottom row shows the yarn in the second row in the top row when viewed from above.

In the knitting structure shown in FIG. 4A, a yarn forming three loops in the first through third columns is aligned in three rows, and the loops in the second and third rows are connected to the loops in the first and second rows, respectively. It is therefore understood that the knitting pattern of the knit are aligned in an array of three rows×three columns. Also, the second column comes on the front and the first and third columns come on the back. Accordingly, as is shown in the bottom row in FIG. 4A, it is understood that the yarn in the second row is convex toward the front in the region corresponding to the loop in the second column, and this yarn is convex toward the back in regions corresponding to the loops in the first and third columns.

Also, in the knitting structure shown in FIG. 4B, a yarn forming three loops in the first through third columns is aligned in the first and third rows, a yarn forming two loops in the first and third columns is aligned in the second row, and the loop in the third row and in the second column is connected to the loop in the first row and in the second column. It is therefore understood that the knitting pattern of the welt is included. Also, the second column comes on the front and the first and third columns come on the back. Accordingly as is shown in the bottom row in FIG. 4B, it is understood that the yarn in the second row is closed on the back in regions corresponding to the loops in the first and third columns and becomes flat along the back in the region corresponding to the loop in the second column.

Also, in the knitting structure shown in FIG. 4C, a yarn forming three loops in the first through third columns is aligned in three rows, and the loop formed in the third row and in the second column and the loop formed in the second row and in the second column are connected to the loop formed in the first row and in the second column. It is therefore understood that the knitting pattern of the tuck is included. Also, the second column comes on the front and the first and third columns come on the back. Accordingly, as is shown in the bottom row in FIG. 4C, it is understood that the yarn in the third row is convex toward the back in regions corresponding to the loops in the first and third columns and this yarn is convex toward the front in the region corresponding to the loop in the second column.

FIG. 5A through FIG. 5C are views showing the knitting structure data corresponding to FIG. 4A through FIG. 4C, respectively. As is shown in FIG. 4A, the first and third columns represent the back and the second column represents the front and the knitting pattern of the knit is aligned in an array of three rows×three columns. Hence, in the knitting structure data shown in FIG. 5A, a lower case "k" as the symbol is aligned in the first and third columns and an upper case "K" as the symbol is aligned in the second column. Meanwhile, as is shown in FIG. 4B, the first and third columns represent the back and the second column represents the second column and the knitting pattern of the welt is included in the second row and in the second column. Hence, in the knitting structure data shown in FIG. 5B, a lower case "k" is aligned in each row in the first and third columns and "K, W, and K" are aligned, respectively, in the first through third rows and in the second column.

In addition, as is shown in FIG. 4C, the first and third columns represent the back and the second column represents the second column. Hence, in the knitting structure data shown in FIG. 5C, a lower case "k" is aligned in each row in the first and third columns and "K, T, and K" are aligned, respectively, in the first through third rows and in the second column. FIG. 4A through FIG. 4C show the knitting structure data for an array of three rows×three columns. It should be appreciated, however, that this configuration is a mere example and the number of rows and the number of columns can be changed as needed with the size of the knitting structure.

In Step S3 shown in FIG. 3, the node aligning portion 12 aligns the nodes within a specific plane and the simplified model generating portion 13 generates the simplified knitting structure model by connecting the aligned nodes and carrying out the generation processing of the simplified knitting structure model described below.

In Step S4, the display control portion 16 displays the knitting structure model generated by the simplified model generation portion 13 on the display portion 40. In Step S5, in a case where an instruction to generate the solid knitting structure model is inputted in the input portion 30 by the user (YES in S5), the solid model generation portion 14 generates the solid knitting structure model from the simplified knitting structure model generated by the simplified model generating portion 13 (S6). Meanwhile, in a case where the instruction to generate the solid knitting structure model from the user is not accepted in the input portion 30 in Step S5 (NO in S5), the flow returns to the processing in Step S5.

It may be configured in such a manner that in a case where there is an input in the input portion 30 from the user to specify a simplified knitting structure model generated by the simplified model generating portion 13 in the past, the display control portion 16 reads out the specified simplified knitting structure model from the simplified model storage portion 21 and displays this simplified knitting structure model on the display portion 40.

In Step S7, the rendering portion 15 renders the solid knitting structure model generated in Step S6, and the display control portion 16 displays the rendered solid knitting structure model on the display portion 40 (S8). It may be configured in such a manner that in a case where there is an input in the input portion 30 from the user to specify a solid knitting structure model generated by the solid state model generating portion 14 in the past, the display control portion 16 reads out the specified solid knitting structure model from the solid model storage portion 22 and displays this solid knitting structure model on the display portion 40.

Figure 6:
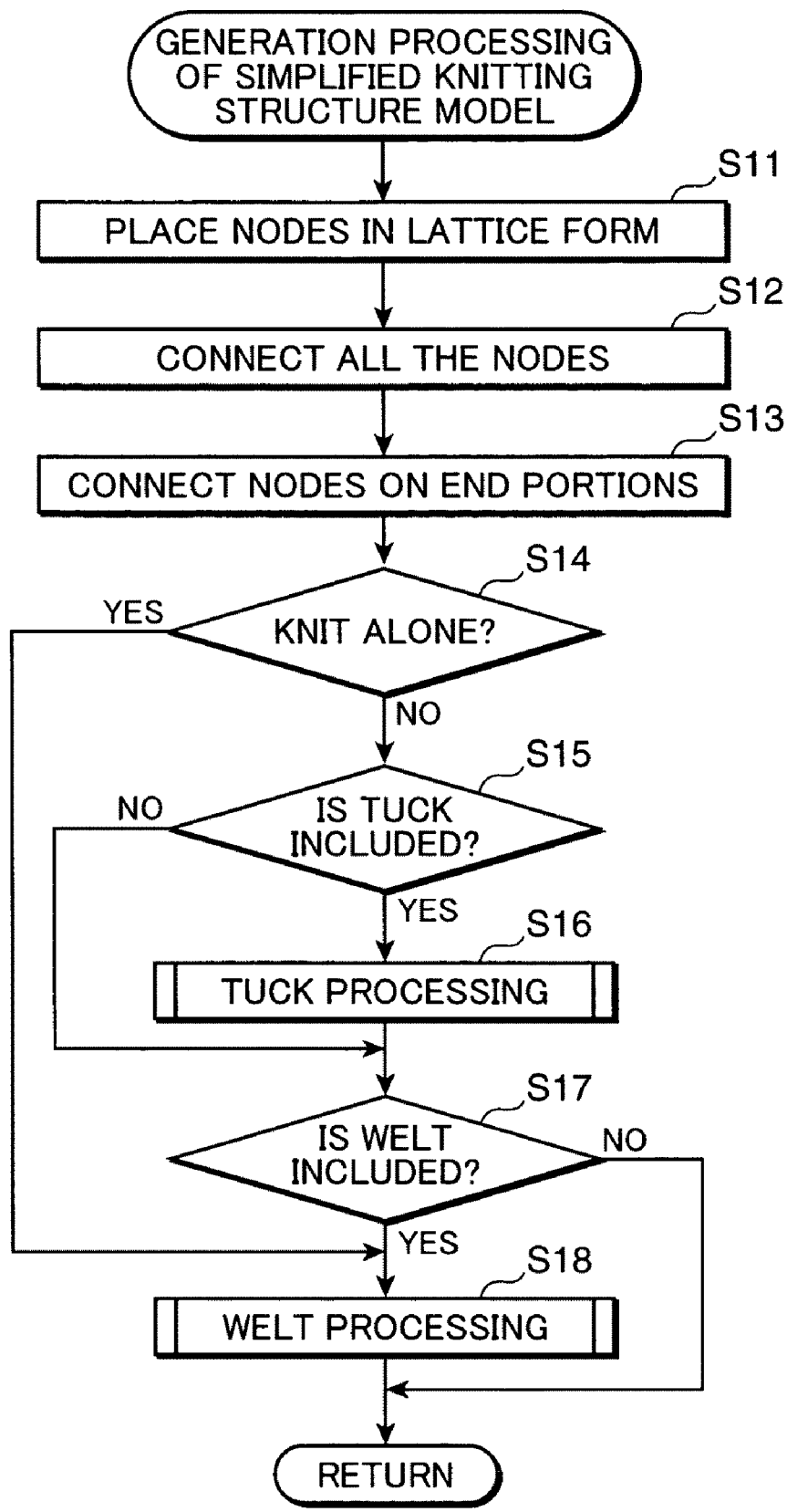
FIG. 6 is a flowchart showing the generation processing of a simplified knitting structure model shown in Step S3 of FIG. 3.
Figure 7:
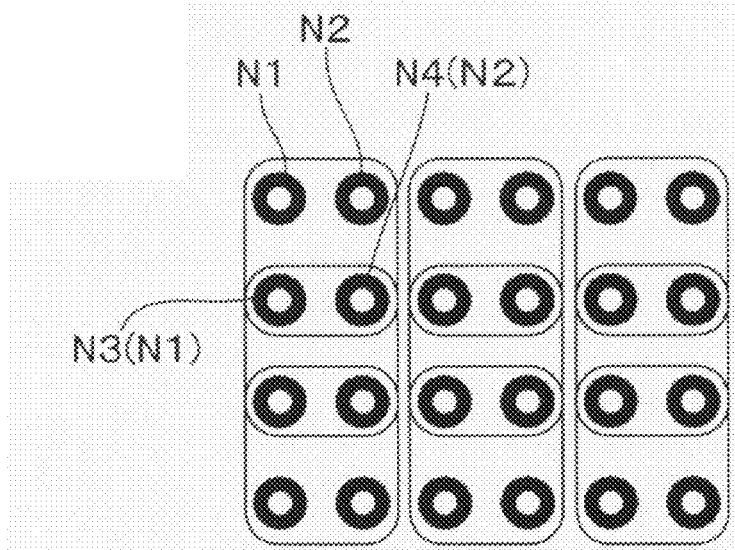
FIG. 7 is a view showing nodes aligned within the XY plane in a case where the knitting structure data is made up of an array of three rows×three columns.

FIG. 6 is a flowchart showing the generation processing of the simplified knitting structure model shown in Step S3 in FIG. 3. Initially, the node aligning portion 12 aligns the nodes in a lattice form within the XY plane in a virtual three-dimensional space according to the knitting structure data acquired by the knitting structure data acquiring portion 11. FIG. 7 is a view showing the nodes aligned within the XY plane in a case where the knitting structure data is made up of an array of three rows×three columns.

The node aligning portion 12 allocates four nodes to one symbol representing a knitting pattern. Of the four nodes allocated to each symbol, the node on the upper left is referred to as a first node N1, the node on the upper right is referred to as a second node N2, the node on the lower left is referred to as a third node N3, and the node on the lower right is referred to as a fourth node N4. Also, the node aligning portion 12 aligns the respective nodes in such a manner that the third node N3 and the fourth node N4 allocated to a given symbol are aligned in common, respectively, with the first node N1 and the second node N2 allocated to another symbol present adjacently on the lower side of the firstly-mentioned symbol. For example, as is shown in FIG. 7, the third node N3 and the fourth node N4 allocated to the symbol in the first row and in the first column are common, respectively, with the first node N1 and the second node N2 allocated to another symbol in the second row and in the first column. Accordingly, in a case where the knitting structure data acquired in the knitting structure acquiring portion 11 is made up of symbols for an array of, for example, three rows×three columns, as is shown in FIG. 7, the node aligning portion 12 aligns four nodes in the longitudinal direction and six nodes, which is two times three that is the number of columns in the knitting structure data, in the lateral direction, and thereby aligns a total of 24 nodes within the XY plane. Four nodes are aligned in the longitudinal direction in FIG. 7. However, because nodes on the upper end are common with the nodes on the lower end, three nodes are aligned in the longitudinal direction in practice.

In Step S12 shown in FIG. 6, the simplified model generating portion 13 connects the nodes adjacent to each other in the longitudinal direction with first edges and connects the nodes adjacent to each other in the lateral direction with the first edges. It should be noted that the first edges are correlated with a first elastic constant used when stress acting on each node is calculated on the assumption that the node is a mass point of the knit fabric. In addition, second edges described below are correlated with a second elastic constant smaller than the first elastic constant.

Figure 8:
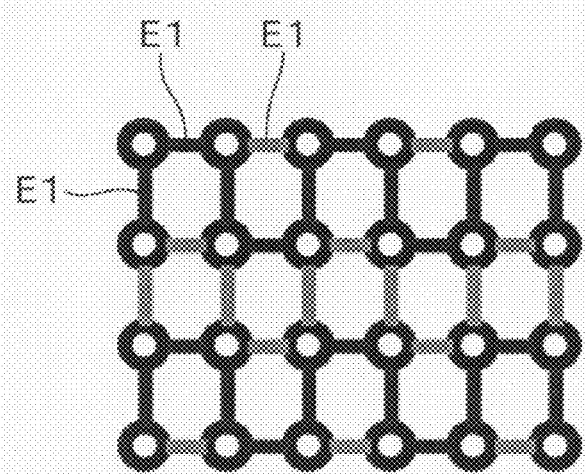
FIG. 8 is a view showing a state where nodes are connected to one another.

FIG. 8 is a view showing a state where the nodes are connected to one another. It is understood that, as is shown in FIG. 8, the nodes adjacent to each other in the lateral direction and the nodes adjacent to each other in the longitudinal direction are connected with the first edges E1. It is also understood that two or three first edges E1 are connected to the nodes aligned on the upper end, the lower end, the left end, and the right end. Meanwhile, it is understood that four first edges E1 are connected to the nodes present inside.

Figure 9:
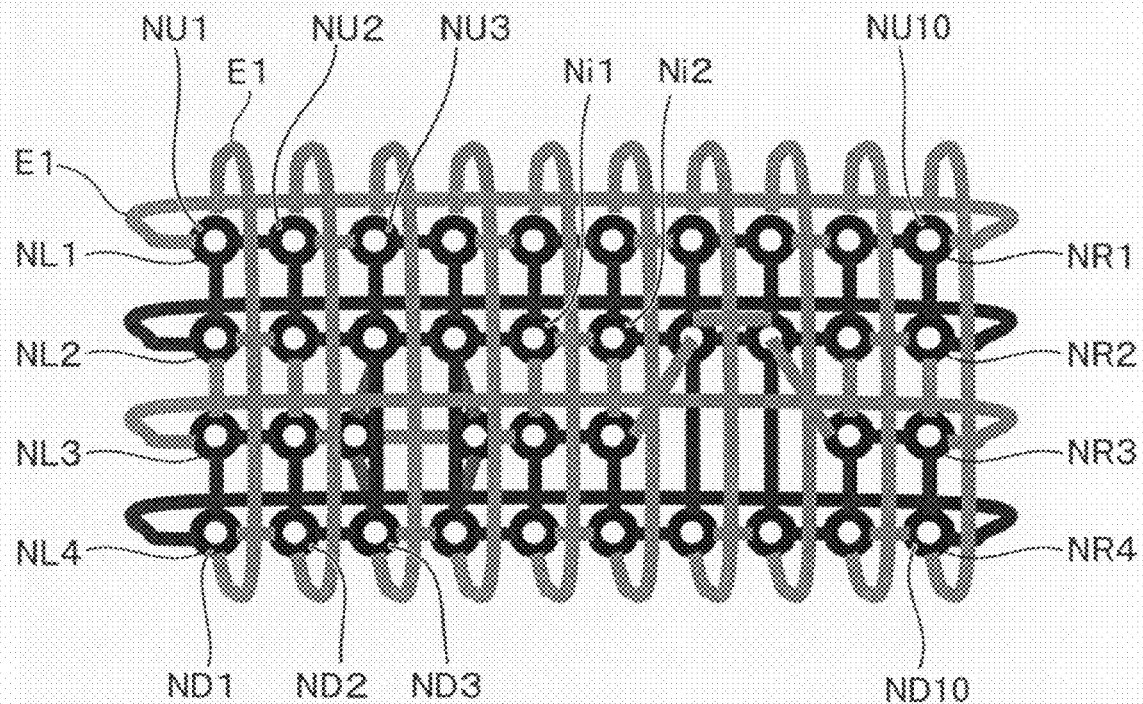
FIG. 9 is a view used to describe the processing in Step S13.
Figure 10:
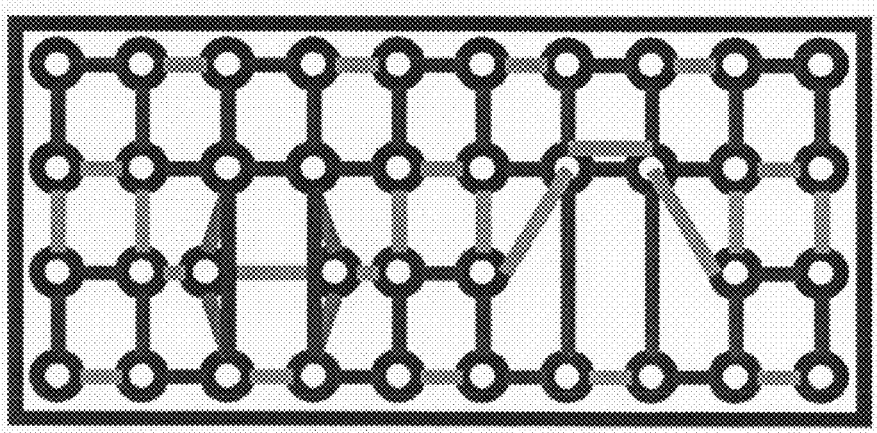
FIG. 10 is another view used to describe the processing in Step S13.
Figure 11A:
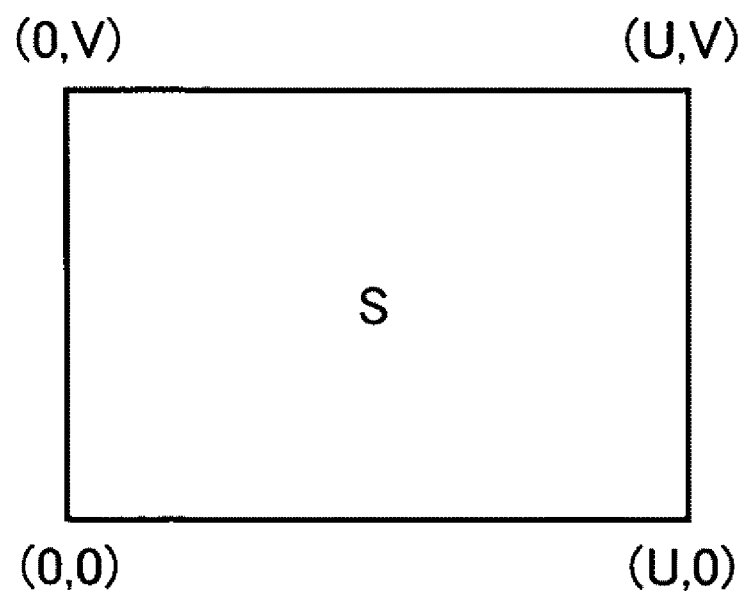
FIG. 11A and FIG. 11B are still other views used to describe the processing in Step S13.
Figure 11B:
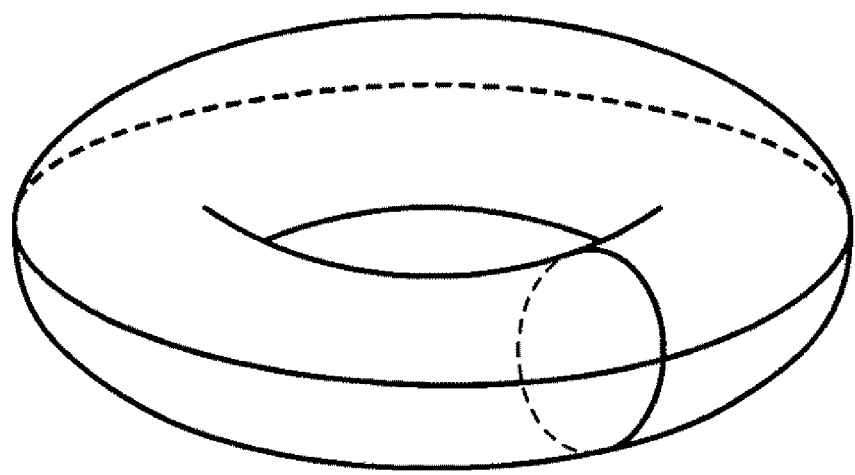

In Step S13 shown in FIG. 6, the simplified model generating portion 13 makes the simplified knitting structure model in a torus shape by connecting the nodes positioned on the upper end and those on the lower end and connecting the nodes positioned on the left end and those on the right end. FIG. 9 through FIG. 11 are views used to describe the processing in Step S13.

As is shown in FIG. 9, the simplified model generating portion 13 connects the nodes NL1 through NL4 positioned on the left end to the nodes NR1 through NR4 positioned on the right end in the same rows with the first edges E1, and connects the node NU1 through NU10 positioned on the upper end and the nodes ND1 through ND10 positioned on the lower end in the same columns with the first edges E1.

Consequently, given that the simplified knitting structure model as is shown in FIG. 10 is a single knitting structure unit, then, in a case where a simplified knitting structure model in which more than one knitting structure unit is aligned in a matrix fashion is generated, it becomes possible to express the entire region by aligning the nodes merely in a region of the knitting structure unit without having to align the nodes across the entire region of the simplified knitting structure model. It is therefore possible to markedly reduce a data volume of the simplified knitting structure model. This can be compared to an operation to deform a rectangular plane shown in FIG. 11A to a torus shape shown in FIG. 11B by connecting the upper edge and the lower edge and connecting the left edge and the right edge of this plane.

In Step S14, in a case where the knitting structure data acquired by the knitting structure data acquiring portion 11 includes only the knitting pattern of the knit and excludes the knitting patterns of the welt and the tuck (YES in S14), the simplified model generating portion 13 ends the processing because the simplified knitting structure model for the knitting structure data of interest is completed. Meanwhile, in a case where the knitting structure data includes the knitting pattern of the welt or the tuck in addition to that of the knit (NO in S14), the flow proceeds to the processing in Step S15.

In Step S15, in a case where the knitting structure data includes the knitting pattern of the tuck (YES in S15), the simplified model generating portion 13 carries out tuck processing described below for the nodes aligned within the XY plane (S16). The simplified knitting structure model having the knitting pattern of the tuck is thus generated. Meanwhile, in a case where the knitting pattern of the tuck is not included in Step S15 (NO in S15), the flow proceeds to the processing in Step S17.

In Step S17, in a case where the knitting structure data includes the knitting pattern of the welt (YES in S17), the simplified model generating portion 13 carries out welt processing described below (S18). The simplified knitting structure model having the knitting pattern of the welt is thus generated. Meanwhile, in a case where the knitting pattern of the welt is not included in Step S17 (NO in S17), the processing is ended by skipping the welt processing.

Figure 12:
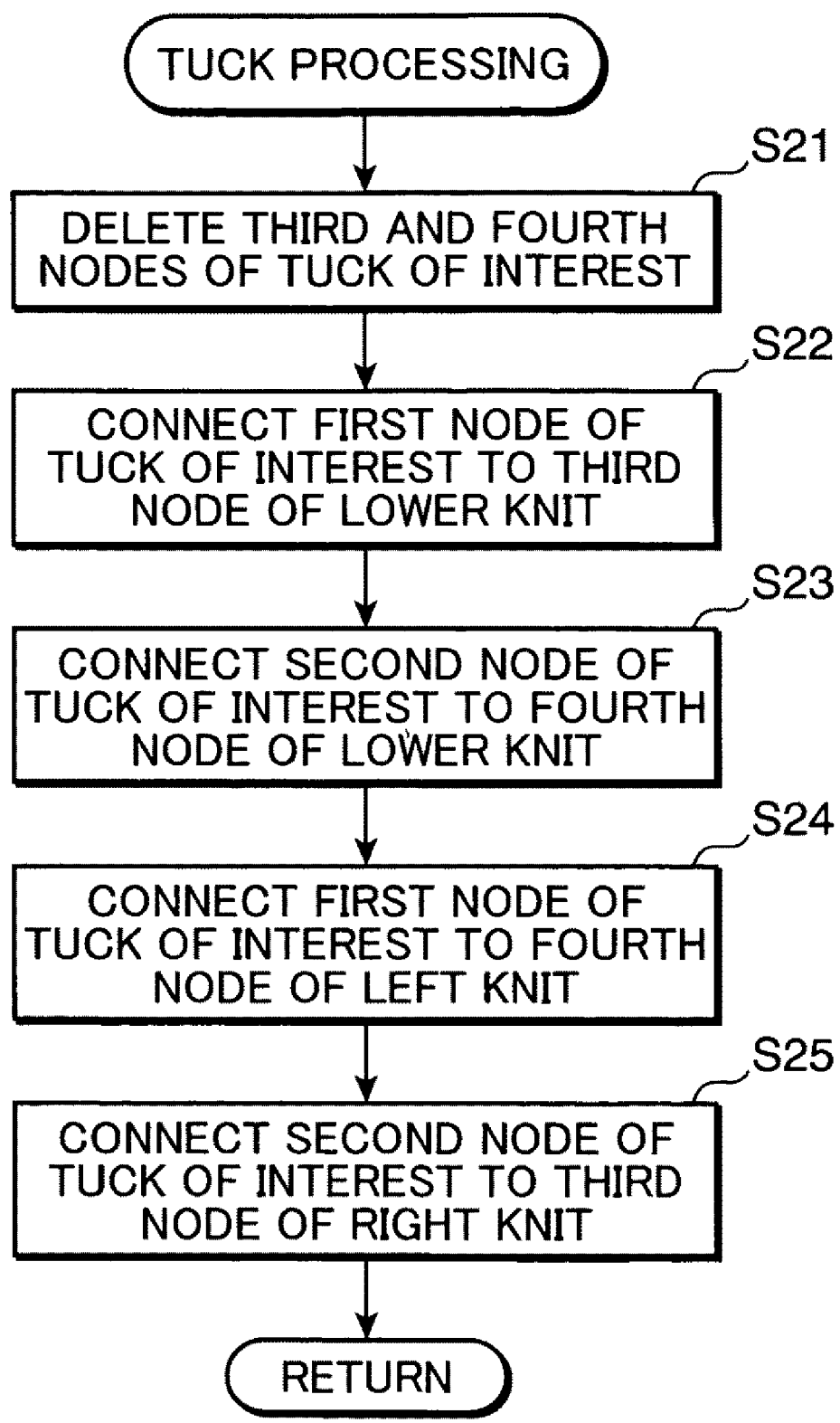
FIG. 12 is a flowchart detailing tuck processing shown in Step S16.

FIG. 12 is a flowchart detailing the tuck processing shown in Step S16 of FIG. 6. In Step S21, the simplified model generating portion 13 deletes the third node N3 and the fourth node N4 allocated to a tuck of interest, which is one tuck among the tucks making up the knitting structure data, and deletes the first edges E1 connected to each of the third node N3 and the fourth node N4.

Figure 13:
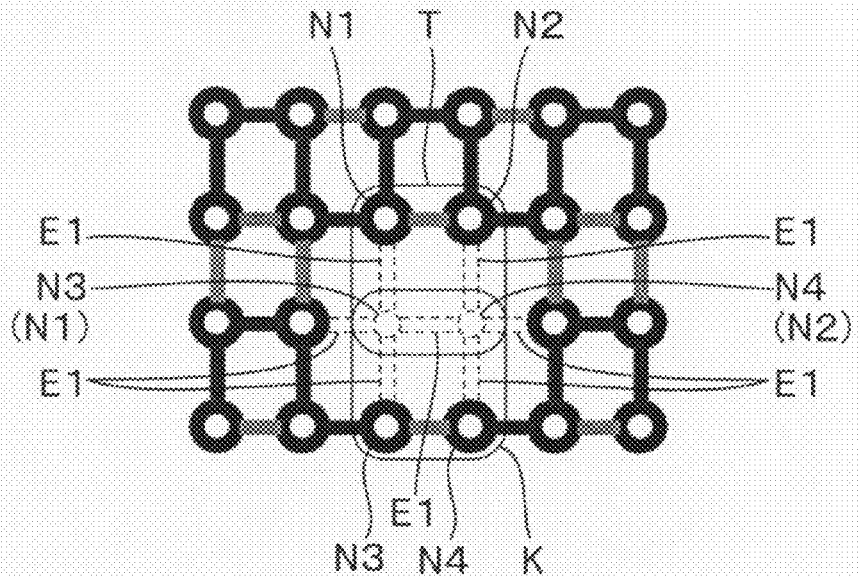
FIG. 13 is a view used to describe the processing in Step S21.

FIG. 13 is a view used to describe the processing in Step S21. It is understood that, as is shown in FIG. 13, the third node N3 and the fourth node N4 allocated to the tuck T of interest are deleted while four first edges E1 connected to the third node N3 are deleted and four first edges E1 connected to the fourth node N4 are deleted.

Figure 14:
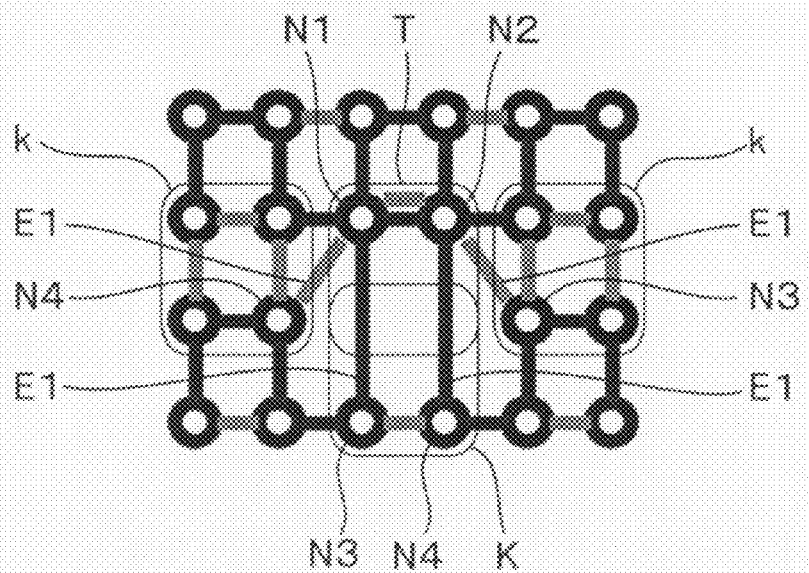
FIG. 14 is a view used to describe the tuck processing.

Subsequently, as is shown in FIG. 14, the simplified model generating portion 13 connects the first node N1 allocated to the tuck T of interest and the third node N3 allocated to a lower knit K present adjacently on the lower side of the tuck T with the first edge E1 (S22), and connects the second node N2 allocated to the tuck T of interest and the fourth node N4 allocated to the lower knit K with the first edge E1 (S23).

Subsequently, as is shown in FIG. 14, the simplified model generating portion 13 connects the fourth node N4 of a left knit k present adjacently on the left side of the tuck T of interest and the first node N1 of the tuck T of interest with the first edge E1 (S24) and connects the third node N3 of a right knit k present adjacently on the right side of the tuck T of interest and the second node N2 of the tuck T of interest with the first edge E1 (S25). The simplified knitting structure model including the knitting pattern of the tuck T of interest as is shown in FIG. 14 is thus generated. The simplified model generating portion 13 carries out the processing described above repetitively using the symbol of each tuck included in the knitting structure data as the tuck of interest.

Figure 15:
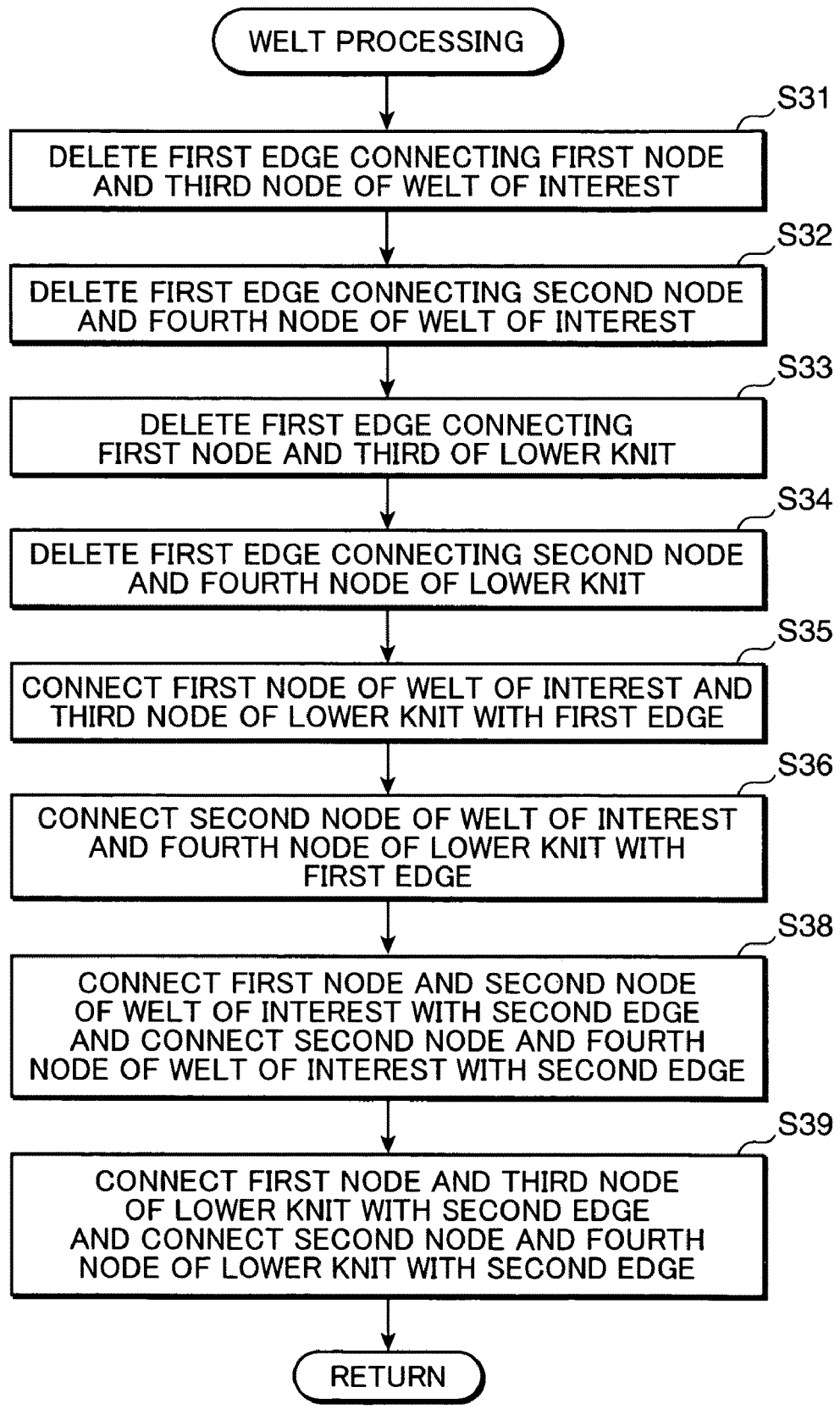
FIG. 15 is a flowchart detailing welt processing.
Figure 16:
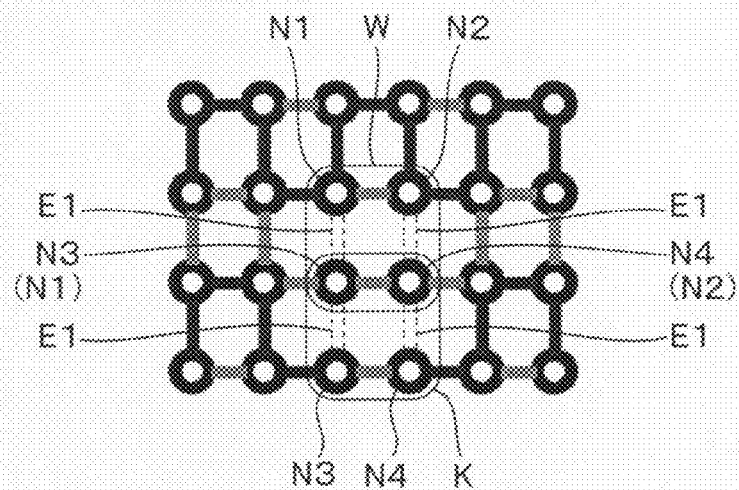
FIG. 16 is another view used to describe the welt processing.
Figure 17:
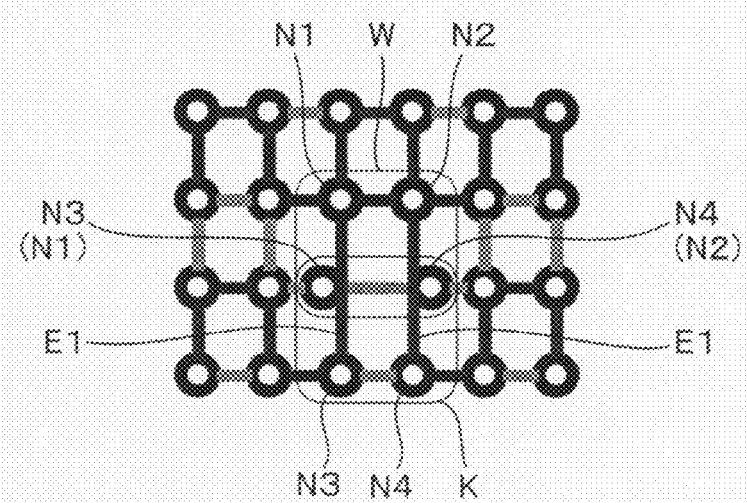
FIG. 17 is still another view used to describe the welt processing.
Figure 18:
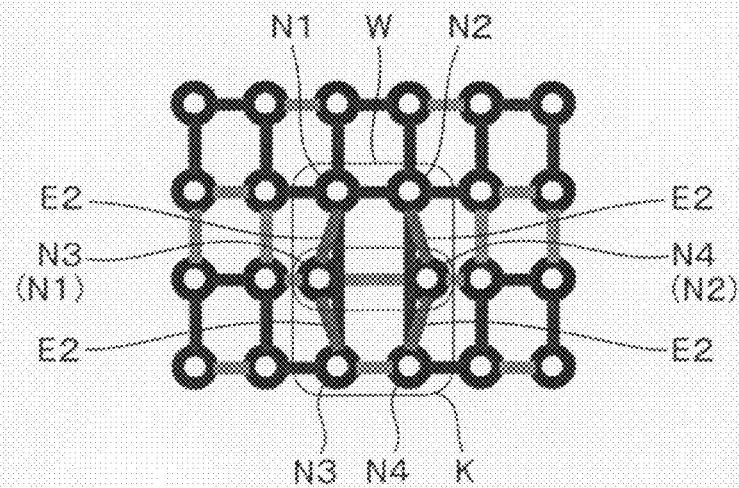
FIG. 18 is still another view used to describe the welt processing.

FIG. 15 is a flowchart detailing the welt processing shown in Step S18 of FIG. 6. FIG. 16 through FIG. 18 are views used to describe the welt processing. Hereinafter, the welt processing will be described with reference to FIG. 16 through FIG.

18. Initially, in Step S31, as is shown in FIG. 16, the simplified model generating portion 13 deletes the first edge E1 connecting the first node N1 and the third node N3 allocated to a welt W of interest, which is one welt among welts making up the knitting structure data (S31), and deletes the first edge E1 connecting the second node N2 and the fourth node N4 allocated to the welt W of interest (S32). Subsequently, the simplified model generating portion 13 deletes the first edge E1 connecting the first node N1 and the third node N3 allocated to the lower knit K present adjacently on the lower of the welt W of interest (S33) and deletes the first edge E1 connecting the second node N2 and the fourth node N4 allocated to the lower knit K (S34).

Subsequently, as is shown in FIG. 17, the simplified model generating portion 13 connects the first node N1 allocated to the welt W of interest and the third node N3 allocated to the lower knit K present adjacently on the lower side with the first edge E1 (S35) and connects the second node N2 allocated to the welt W of interest and the fourth node N4 allocated to the lower knit K present adjacently on the lower side with the first edge E1 (S36).

For ease of view, the third node N3 and the fourth node N4 of the welt W of interest are spaced apart widely in FIG. 17 and FIG. 18. It should be appreciated, however, that the interval between the third node N3 and the fourth node N4 of the welt W of interest is equal to the interval shown in FIG. 16 in practice.

Subsequently, as is shown in FIG. 18, the simplified model generating portion 13 connects the first node N1 and the third node N3 allocated to the welt W of interest with the second edge E2 and connects the second node N2 and the fourth node N4 allocated to the welt W of interest with the second edge E2 S38).

Subsequently, as is shown in FIG. 18, the simplified model generating portion 13 connects the first node N1 and the third node N3 allocated to the lower knit K with the second edge E2 and connects the second node N2 and the fourth node N4 allocated to the lower knit K with the second edge E2 (S39). The simplified model generating portion 13 carries out the processing described above using each of welts making up the knitting structure data as the welt of interest.

Figure 19:
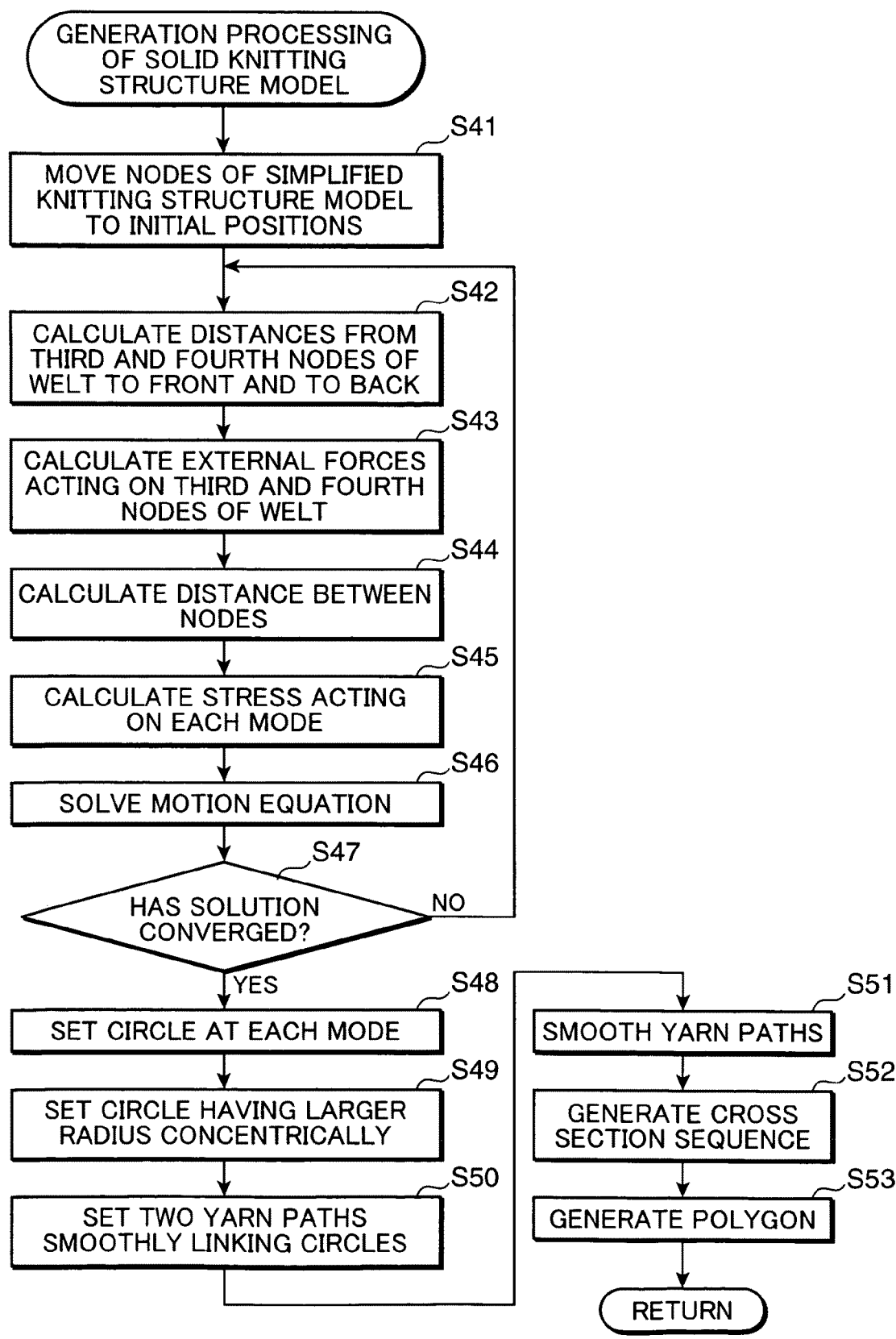
FIG. 19 is a flowchart showing the generation processing of a solid knitting structure model.
Figure 20:
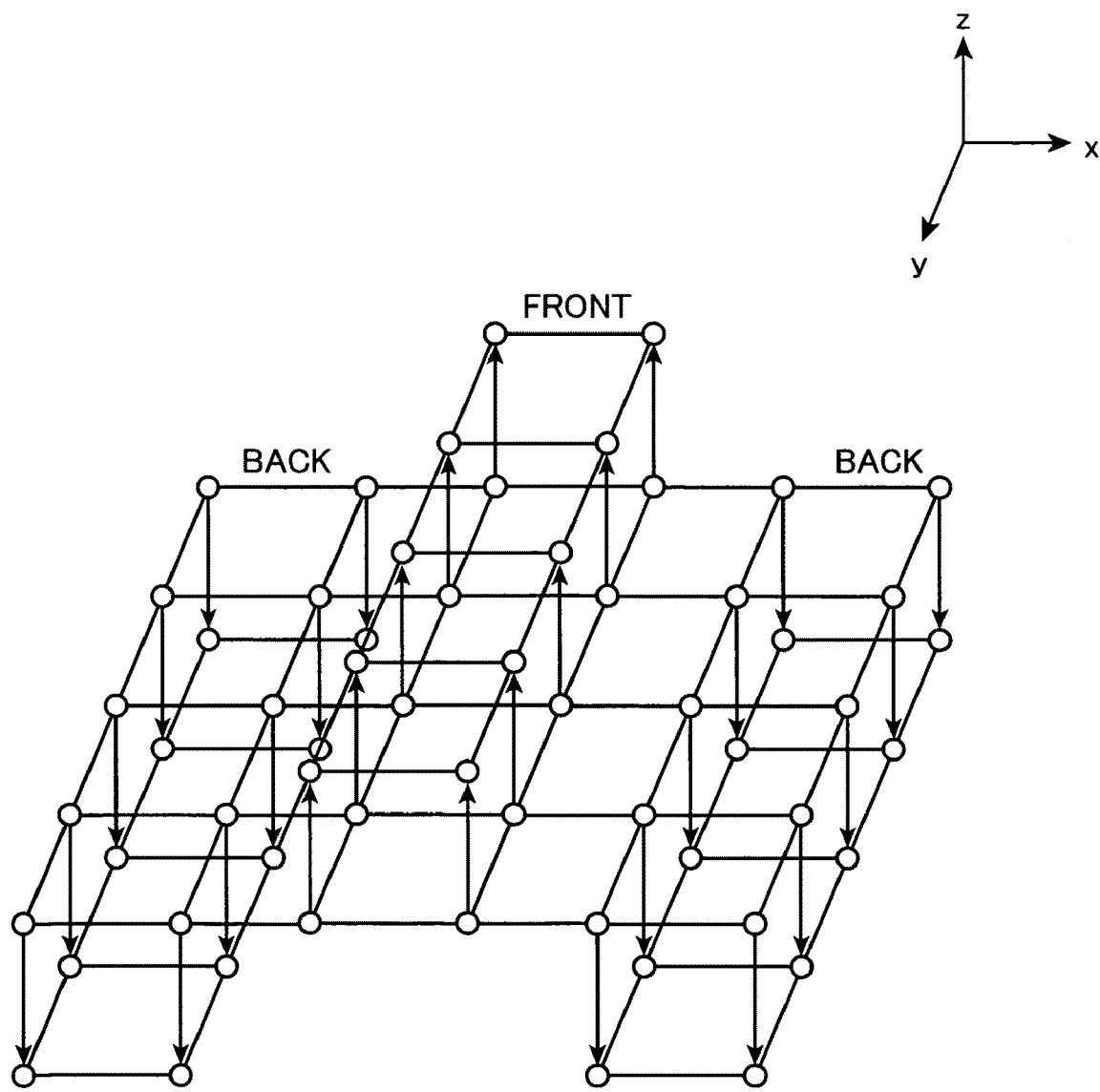
FIG. 20 is a view showing a simplified knitting structure model formed of the knitting pattern of a knit alone made up of an array of three rows×three columns placed within a virtual three-dimensional space.

The generation processing of the solid knitting structure model shown in Step S6 of FIG. 3 will now be described. FIG. 19 is a flowchart showing the generation processing of the solid knitting structure model. Initially, in Step S41, the solid model generating portion 14 places the simplified knitting structure model generated by the simplified model generating portion 13 on the XY plane and moves the respective nodes to specific initial positions. FIG. 20 is a view showing the simplified knitting structure model made up of the knitting pattern of the knit in an array of three rows×three columns placed within a virtual three-dimensional space. As is shown in FIG. 20, x, y, and z axes orthogonal to one another are set in the virtual three-dimensional space and the simplified knitting structure model is placed on the XY plane. Also, in FIG. 20, the nodes placed on the first, second, fifth, and sixth columns from the left are nodes on the back, and the nodes aligned in the third and fourth columns from the left are nodes on the front. Each node on the back is slid by a certain distance in the −z direction and each node on the front is slid by a certain distance in the +z direction, so that each is moved to the specific initial position. Herein, a sliding amount of each node on the back and a sliding amount of each node on the front may be equal or set to different values.

Figure 21A:
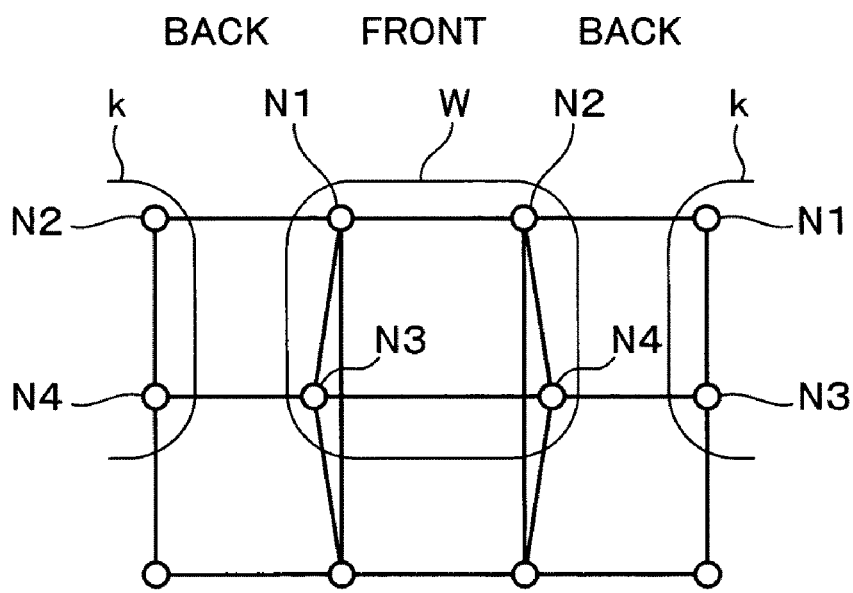
FIG. 21A shows a front view.
Figure 21B:
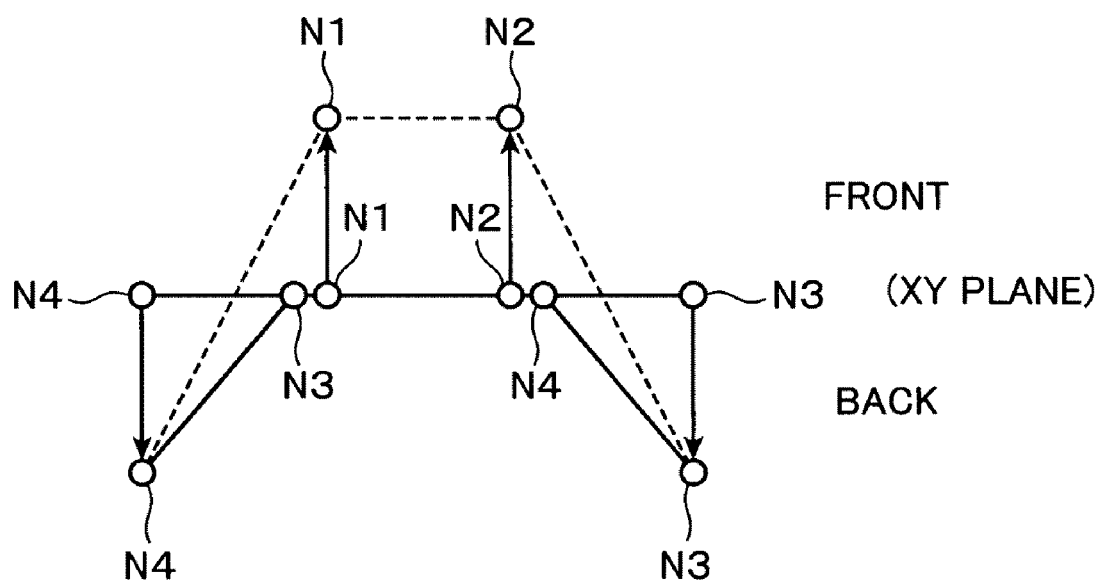
FIG. 21B shows a cross section when viewed from above.

FIG. 21 is a view showing movements of the nodes of the welt W to the initial positions. FIG. 21A is a front view and FIG. 21B is a cross section when viewed from above. It is understood that, as are shown in FIG. 21A and FIG. 21B, the third node N3 and the fourth node N4 of the welt W are positioned on the XY plane because they are not slid in the Z direction. Also, because the first nodes N1 and N2 of the welt W are the nodes on the front, they are slid by a certain distance in the Z direction. In addition, it is understood that the fourth node N4 of the knit K present adjacently on the left side and the third node N3 of the knit K present adjacently on the right side are slid by a certain distance in the −z direction because they are the nodes on the back.

Figure 22A:
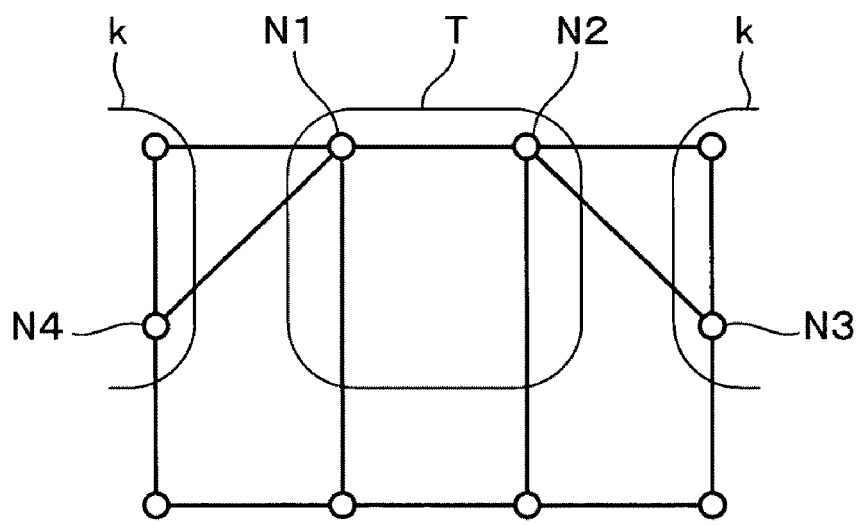
FIG. 22A shows a front view.
Figure 22B:
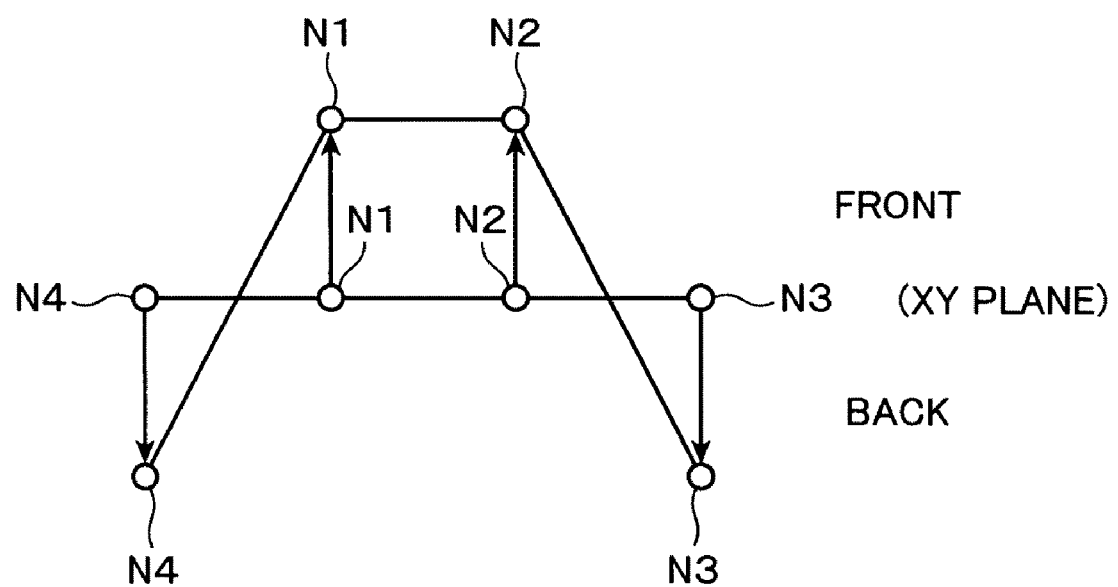
FIG. 22B shows a cross section when viewed from above.

FIG. 22A is a view showing movements of the nodes of the tuck T to the initial values. FIG. 22A is a front view and FIG. 22B is a cross section when viewed from above. It is understood that, as are shown in FIGS. 22A and 22B, the first node N1 and the second node N2 of the tuck T are the nodes on the front and therefore slid by a specific distance in the z direction, the fourth node N4 of the knit K present adjacently on the left side is a node on the back and is therefore slid by a specific distance in the −z direction, and the third node N3 of the knit K present adjacently on the right side is a node on the back and is therefore slid by a specific distance in the −z direction. Hence, the tuck T when viewed in the cross section is of a mountain shape same as the shape of the knit K when viewed in the cross section.

Figure 23:
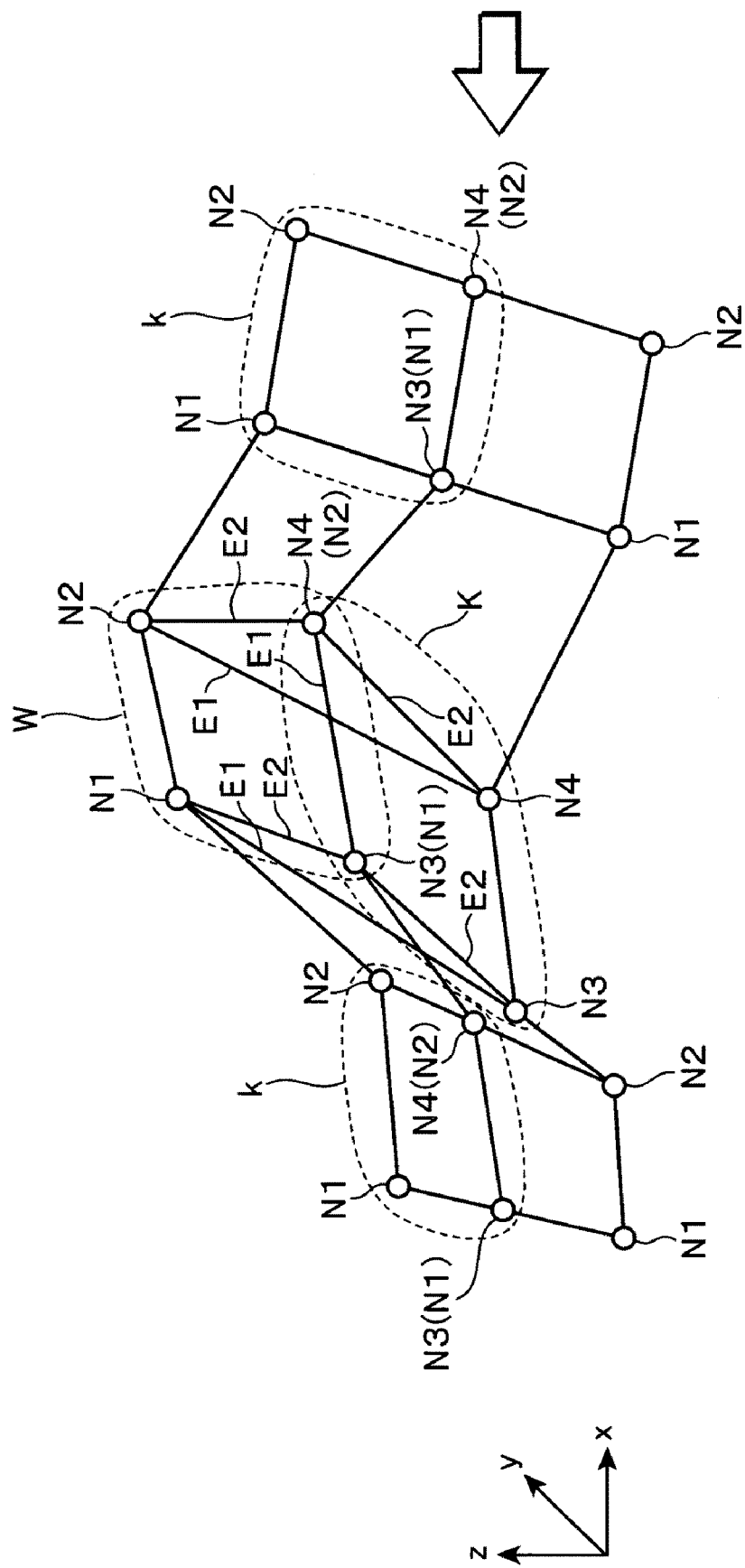
FIG. 23 shows a perspective view of nodes in the vicinity of the welt when processing in Steps S42 through S47 is carried out repetitively to some extent.

In Step S42 shown in FIG. 19, the solid model generating portion 14 calculates external forces acting on the third node N3 and the fourth node N4 of the welt W. FIG. 23 is a perspective view of nodes in the vicinity of the welt W when the processing in Step S42 through S47 is carried out repetitively to some extent.

Herein, as is shown in FIG. 23, the solid model generating portion 14 calculates a distance between a rectangular plane defined by the first node N1 and the second node N2 of the welt W and the third node N3 and the fourth node N4 of the knit K present adjacently on the lower side of the welt W and the third node N3 as a distance between the third node N3 and the front of the solid knitting structure model. Subsequently, the solid model generating portion 14 calculates a distance between the rectangular plane and the fourth node N4 as a distance between the fourth node N4 and the front of the solid knitting structure model.

Subsequently, the solid model generating portion 14 calculates a distance between a rectangular plane defined by the second node N2 and the fourth node N4 of the knit k present adjacently on the left side of the welt W and the first node N1 and the third node N3 of the knit k present adjacently on the right side of the welt W and the third node N3 as a distance between the third node N3 and the back of the solid knitting structure model. Subsequently, the solid model generating portion 14 calculates a distance between the fourth node N4 and the rectangular plane as a distance between the fourth node N4 and the back of the solid knitting structure model.

Figure 24:
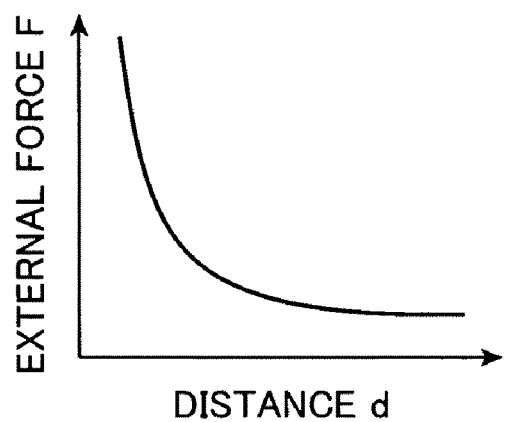
FIG. 24 is a graph showing external forces acting on a third node and a fourth node of the welt using the ordinate for the external force and the abscissa for a distance.

In Step S43, the solid model generating portion 14 finds external forces acting on each of the third nodes N3 and N4 of the welt W using the distances calculated in Step S42. FIG. 24 is a graph showing the external forces acting on the third node N3 and the fourth node N4 of the welt, in which the ordinate is used for the external force and the abscissa is used for the distance. It is understood that, as is shown in FIG. 24, the external force is regulated by a function that is inversely proportional to the distance. In short, the relation of the external force and the distance is expressed as $F=A/d$. Herein, F is an external force, A is a constant, and d is a distance from the third node N3 or N4 of the welt W to the front or to the back of the solid knitting structure model.

The external force is regulated by a function that is inversely proportional to the distance herein in order to reproduce a repulsive force induced when a yarn corresponding to the first edge 1 connecting the third node N3 and the fourth node N4 of the welt W comes into contact with a yarn corresponding to the first edge E1 connecting the first node N1 of the welt W and the third node N3 of the knit K on the lower side of the welt W.

Figure 25:
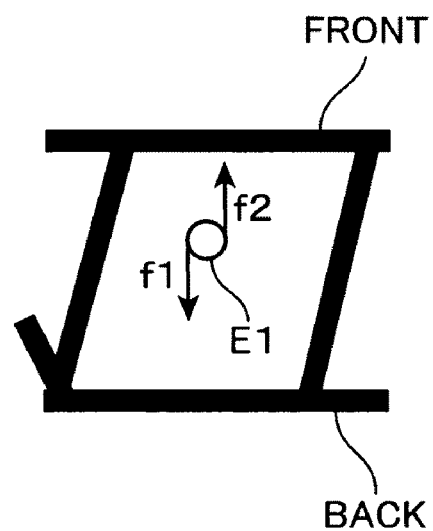
FIG. 25 is a view showing the side view of a solid knitting structure model shown in FIG. 24 in a simplified manner.

FIG. 25 is a view showing the side view of the solid knitting structure model shown in FIG. 24 in a simple manner. In FIG. 25, the upper edge of a rectangular frame represents the front of the solid knitting structure model and the lower edge represents the back of the solid knitting structure model and a circle positioned at the center inside the frame represents the first edge E1 connecting the third node N3 and the fourth node N4 of the welt W. It is understood that the third nodes N3 and N4 of the welt W undergo an external force f1 from the front and undergo an external force f2 from the back as a result of application of the external force regulated by the function and expressed as F=A/d.

In Step S44 shown in FIG. 19, the solid model generating portion 14 calculates distances among the nodes connected to one another with the first edge E1 or the second edge E2 using Equations (1) through (4) below.

$$d_{ij} = |x_i - x_j|^2 + |y_i - y_j|^2 + |z_i - z_j|^2 \quad (1)$$

$$\begin{cases} d_{ij} = |x_i - x_j - w|^2 + |y_i - y_j|^2 + |z_i - z_j|^2, (x_i > x_j) & (2) \\ d_{ij} = |x_i - x_j + w|^2 + |y_i - y_j|^2 + |z_i - z_j|^2, (x_i \leq x_j) & (3) \end{cases}$$

Herein, the solid model generating portion 14 calculates a distance between the nodes positioned inside except for those on the end portions, that is, on the upper end, the lower end, the right side, and the left side, such as a node Ni1 and a node Ni2 shown in FIG. 9, using Equation (1) above. In Equation (1) above, dij is a distance between nodes Pi and Pj positioned inside, xi, yi, zi are x, y, z components of Pi, respectively, and xj, yj, and zj are x, y, and z components of Pj, respectively.

Also, the solid model generating portion 14 calculates a distance between the nodes on the left side and the right side, such as a node NL2 and a node NR2 shown in FIG. 9, using Equation (2) or (3) above. It should be noted, however, that in the case of xi>xj, a distance between the nodes is calculated using Equation (2) above and in the case of xi≦xj, a distance between the nodes is calculated using Equation (3) above. The case of xi>xj referred to herein is a case where Pj is positioned on the left end and Pi is positioned on the right end in FIG. 9. The case of xi≦xj referred to herein is a case where Pj is positioned on the right end and Pi is positioned on the left end in FIG. 9. Herein, w is given as the initial value of a distance between a node on the left end of the simplified knitting structure model and another node positioned on the right end in the same row as the firstly mentioned node.

More specifically, xi–xj–w is given as the first term on the right side in Equation (2). By modifying this to xi–(xj+w), it is understood that the first term means that the position of the node Pj on the left end in the x direction is moved to a position found by adding w, which is the initial value of the crosswise width of the simplified knitting structure model, and a distance between the moved node and the node xi on the right end is calculated as a distance between the node on the left end and the node on the right end. Accordingly, a distance between the nodes connected by bridging from the left end to the right end is corrected to a size comparable to a distance between the nodes positioned adjacently inside. It is thus possible to generate a realistic solid knitting structure model that would otherwise look somewhat unnatural.

Also, the solid model generating portion 14 calculates a distance between nodes on the upper end and the lower end, such as nodes NU2 and ND2 shown in FIG. 9, using Equations (4) and (5) below. It should be noted that in the case of yi>yj, a distance between nodes is calculated using Equation (4) below and in the case of yi≦yj, a distance between nodes is calculated using Equation (5) below. The case of yi>yj referred to herein is a case where Pj is positioned on the upper end and Pi is positioned on the lower end in FIG. 9. The case of yi≦yj referred to herein is a case where Pj is positioned on the lower end and the Pi is positioned on the upper end in FIG. 9.

$$\begin{cases} d_{ij} = |x_i - x_j|^2 + |y_i - y_j - h|^2 + |z_i - z_j|^2, (y_i > y_j) & (4) \\ d_{ij} = |x_i - x_j|^2 + |y_i - y_j + h|^2 + |z_i - z_j|^2, (y_i \leq y_j) & (5) \end{cases}$$

Herein, h is given as an initial value (initial value of the lengthwise width) of a distance between a node on the right end of the solid knitting structure model and another node positioned on the lower end and in the same column as the firstly-mentioned node.

More specifically, yi–yj–h is given as the second term in the right side in Equation (4) above. By modifying this to yi–(yj+h), it is understood that this term means that the position of the node Pj on the upper end in the y direction is moved to a position found by adding h, which is the initial value of the lengthwise width of the simplified knitting structure model, and a distance between the moved node and the node Pi on the lower end is calculated as a distance between the node on the upper end and the node on the lower end. Accordingly, a distance between the nodes connected by bridging from the upper end to the lower end is corrected to be almost the distance between the adjacent nodes positioned inside. It is thus possible to generate a realistic solid knitting structure model that would otherwise look somewhat unnatural.

Further, in a case where the knitting pattern of the tuck T is present on the right end as is shown in FIG. 26A, instead of assuming that the knit K positioned on the left end in the same row as a knit K' present adjacently on the right side and connecting the second node N2 of the tuck T and the third node N3 of the knit K' with the first edge E1', the solid model generating portion 14 connects, as is shown in FIG. 26B, the second node N2 of the tuck T and the third node N3 of the knit K on the left end with the first edge E1 in a crossed fashion.

In this case, the solid model generating portion 14 calculates a distance between the third node N3 of the knit K positioned on the left end and the second node N2 of the tuck T on the right end shown in FIG. 26B using Equation (7) or (8) below.

$$\begin{cases} d_{ij} = |x_i - x_j - w|^2 + |y_i - y_j - h|^2 + |z_i - z_j|^2, (x_i > x_j, y_i > y_j) & (6) \\ d_{ij} = |x_i - x_j + w|^2 + |y_i - y_j - h|^2 + |z_i - z_j|^2, (x_i \leq x_j, y_i > y_j) & (7) \\ d_{ij} = |x_i - x_j - w|^2 + |y_i - y_j + h|^2 + |z_i - z_j|^2, (x_i > x_j, y_i \leq y_j) & (8) \\ d_{ij} = |x_i - x_j + w|^2 + |y_i - y_j + h|^2 + |z_i - z_j|^2, (x_i \leq x_j, y_i \leq y_j) & (9) \end{cases}$$

To be more concrete, in a case where the third node N3 of the knit K on the left end is the node Pj and the second node N2 of the tuck T on the right end is the node Pi, a distance between the nodes Pi and Pj is calculated using Equation (7) above, and in a case where the node of the knit K on the left end is Pi and the second node N2 of the tuck T on the right end is Pj, a distance between the nodes Pi and Pj is calculated using Equation (8) above. Accordingly, a distance between the nodes Pi and Pj is corrected to be almost the distance between the nodes positioned inside. It is thus possible to generate a realistic solid knitting structure model that would otherwise look somewhat unnatural.

Further, in a case where the knitting pattern of the tuck T is present on the left end as is shown in FIG. 27A, instead of assuming that the knit K present on the right end in the same row as a knit K' present adjacently on the left side in the same row and connecting the first node N1 of the tuck T and the fourth node N4 of the knit K' with the first edge E1', the solid model generating portion 14 connects, as is shown in FIG. 27B, the first node N1 of the tuck T and the fourth node N4 of the knit K with the first edge E1 in a crossed fashion.

In this case, the solid model generating portion 14 calculates a distance between the fourth node N4 of the knit K positioned on the right end and the first node N1 of the tuck T on the right end shown in FIG. 27B using Equation (6) or (9) above. To be more concrete, in a case where the first node N1 of the tuck T on the left end is the node Pj and the fourth node N4 of the knit K on the right end is the node Pi, a distance between the nodes Pi and Pj is calculated using Equation (6) above, and in a case where the first node N1 of the tuck T on the left end is the node Pi and the fourth node N4 of the knit K on the right end is the node Pj, a distance between the nodes Pi and Pj is calculated using Equation (9) above. Accordingly, the nodes Pi and Pj are corrected to have a distance almost equal to the distance between the nodes positioned inside. It is thus possible to generate a realistic solid knitting structure model that would otherwise look somewhat unnatural.

Figure 28:
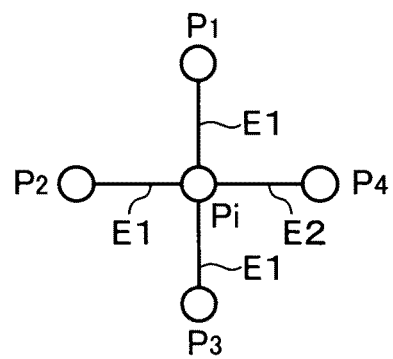
FIG. 28 is a view used to describe a calculation of stress.

In Step S45 shown in FIG. 19, the solid model generating portion 14 calculates stress acting on the respective nodes using distances among the respective nodes calculated in Step S44. Herein, the solid model generating portion 14 calculates the second and third terms on the right side of Equation (10) below as the stress. To be more concrete, assume that, as is shown in FIG. 28, four nodes P1 through P4 are connected to the node Pi, and Pi and P1, P2, and P3 are connected with the first edges E1 and P1 and P4 are connected with the second edge E2. Then, the third term in Equation (10) below can be expressed as Equation (11) below.

$$\begin{cases} f_i = m_i \frac{dv_i}{dt} + c_i v_i + \sum_j k_{ij} \frac{P_i - P_j}{|P_i - P_j|} \\ v_i = \frac{dP_i}{dt} \end{cases} \quad (10)$$

Herein, Pi is a node to which a motion equation is applied, Pj is another node connected to Pi, mi is the mass of the node Pi, ci is viscous resistance of Pi, kij is a visco-elastic constant, and vi is the velocity of the node Pi. Also, Pi, Pj, vi, and fi are vectors made up of three components including x, y, and z.

$$P_i = k_{i1} \frac{P_i - P_1}{|P_i - P_1|} + k_{i2} \frac{P_i - P_2}{|P_i - P_2|} + k_{i3} \frac{P_i - P_3}{|P_i - P_3|} + k_{i4} \frac{P_i - P_4}{|P_i - P_4|} \quad (11)$$

Herein, because the nodes P1 through P3 are connected to the node Pi with the first edges E1, ki1, ki2, and ki3 are first elastic constants, and because the node P4 is connected to the node Pi with the second edge E2, ki4 is a second elastic constant smaller than the first elastic constant. It should be noted that first elastic constant is correlated with the first edge E1 and the second elastic constant is correlated with the second edge E2.

Also, the solid model generating portion 14 calculates the second term in Equation (10) above by multiplying the velocity vi of the node Pi, which is obtained by solving the motion equation expressed by Equation (10) above, by the viscous resistance ci. Herein, the viscous resistance ci may adopt the same value for all the nodes or may be changed depending on how many first edges and second edges are connected to each node.

In Step S46 shown in FIG. 19, the solid model generating portion 14 calculates the position and the velocity of each node Pi by solving the motion equation expressed by Equation (10) above that is established for each node Pi. Herein, fi in the left side of Equation (10) is an external force acting on each node Pi that is calculated in Step S43. Herein, mi is the mass at the mass point of the knit fabric. The value of mi may adopt the same value for all the nodes or may adopt different values. Also, the value adopted for mi is the value determined preliminarily from the relation of the kind of the knit fabric and the size and the number of nodes of the knit fabric when the knit fabric is represented by nodes.

In practice, the solid model generating portion 14 solves the motion equation for each node using Equation (12) below expressing a differential equation of the motion equation expressed by Equation (10) above.

$$\begin{cases} v_i(t + \Delta t) = \frac{\Delta t}{m_i} \left[ (c_i - m_i) v_i(t) + \sum_j k_{ij} \frac{P_i(t) - P_j(t)}{|P_i(t) - P_j(t)|} - f_i(t) \right] \\ P_i(t + \Delta t) = \Delta t v_i(t) + P_i(t) \end{cases} \quad (12)$$

Herein, t is the time and $\Delta t$ is a nick of time.

In Step S47, the solid model generating portion 14 determines whether the solution of the motion equation expressed by Equation (12) converges within a specific range. In a case where it is determined that the solution has converged (YES in S47), the flow proceeds to the processing in Step S48. In a case where it is determined that the solution has not converged (NO in S47), the flow returns to the processing in Step S42. In short, the motion equation is calculated repetitively until the solution of the motion equation expressed by Equation (12) converges. Herein, the phrase, "the solution of the motion equation converges", referred to herein corresponds to a case where a difference between the latest solution and the solution calculated last time becomes smaller than a specific value for Pi indicating the position or vi indicating the velocity of each node in Equation (12).

Alternatively, it may be determined that the solution has converged when the motion equation is calculated a predetermined number of times.

Figure 29:
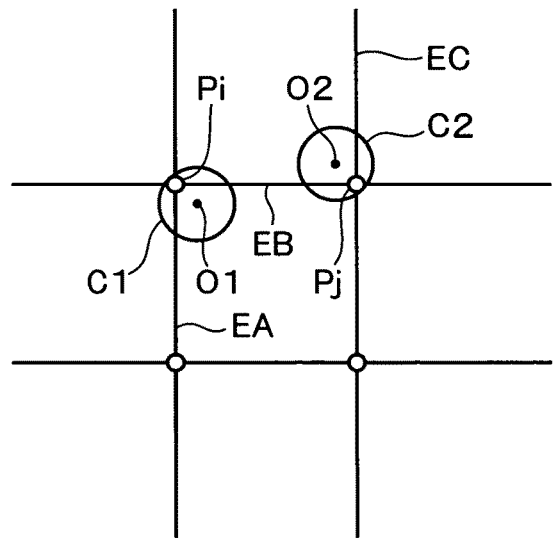
FIG. 29 is a view showing circles set at nodes.

In Step S48, the solid model generating portion 14 sets a circle used to set a yarn to the solid knitting structure model along the edges connected to the respective nodes. To be more concrete, as is shown in FIG. 29, in a case where yarns corresponding to the edges EA and EB connected to the node Pi are set, a circle C1 having a specific radius is set in such a manner that the circumference passes through the node Pi and the center O1 is positioned on the edges EA and EB side. In a case where yarns corresponding to the edges EB and EC connected to the node Pj are set, a circle C2 having a specific radius is set in such a manner that the circumference passes through the node Pj and the center O2 is positioned on the edges EB and EC side. Herein, values preliminarily determined in response to the physical property of the yarns are adopted as the radii of the circles C1 and C2, and either a value that varies from node to node or the same value is adopted.

Figure 30:
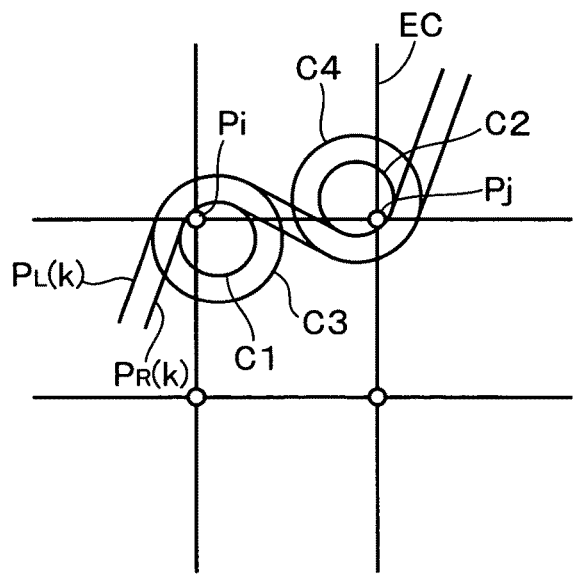
FIG. 30 is a view showing the setting of yarn paths.

In Step S49, the solid model generating portion 14 sets circles having radii larger than the radii set for the circles at the respective nodes concentrically. To be more concrete, as is shown in FIG. 30, a circle C3 having a radius larger than that of the circle C1 set at the node Pi is set concentrically, and a circle C4 having a radius larger than that of the circle C2 set at the node Pj is set concentrically.

In Step S50 shown in FIG. 19, the solid model generating portion 14 sets two lines smoothly linking every two circles set at the respective nodes as yarn paths. To be more concrete, as is shown in FIG. 30, a yarn path $P_R(k)$ smoothly linking the circle C1 and the circle C4 and a yarn path $P_L(k)$ smoothly linking the circle C3 and the circle C2 are set. Herein, for the radii of the circles C3 and C4, values such that make the interval between $P_R(k)$ and $P_L(k)$ equal to the thickness of the yarn determined according to the kinds of the yarn are adopted. Herein, k is a parameter representing the yarn path and the domain thereof is expressed as $-\pi < k \leq \pi$.

In Step S51, the solid model generating portion 14 carries out processing to smooth the two yarn paths that have been set. Herein, the solid model generating portion 14 calculates a first-order term found when a function (original function) representing the each yarn path that has been set is expanded by a Fourier series, and then smoothes the original function by expanding a function, which is found by subtracting the calculated first-order term from the original function, by a Fourier series to a lower-order (for example, third-order term) term. The solid model generating portion 14 isolates the original function to three components, x, y, and z, and carries out the processing described above for each component.

Descriptions will be given to a case of the x component by way of example where x(k) is given as the x component of the original function. The solid model generating portion 14 calculates x1(t), which is the first-order term when x(k) is expanded by a Fourier series. Herein, $x1(k)=((x(\pi)-x(-\pi))/2\pi)\cdot k+x(-\pi)$. Subsequently, after x(k)-x1(k) is expanded by a Fourier series to a lower-order term, the first-order term is added. In this manner, x(k) is smoothed.

Generally, continuous three-dimensional lines are expressed by a function, the y and z components are expressed as $y(-\pi)=y(\pi)$ and $z(-\pi)=z(\pi)$, respectively, and continuous at the boundary. On the contrary, the x components is expressed as $x(-\pi)$ $x(\pi)$, and discontinuous at the boundary. Such being the case, the knitting structure model generating device makes the x component continuous by adding the first-order term after to x(k)-x1(k) is expanded by a Fourier series.

Figure 31:
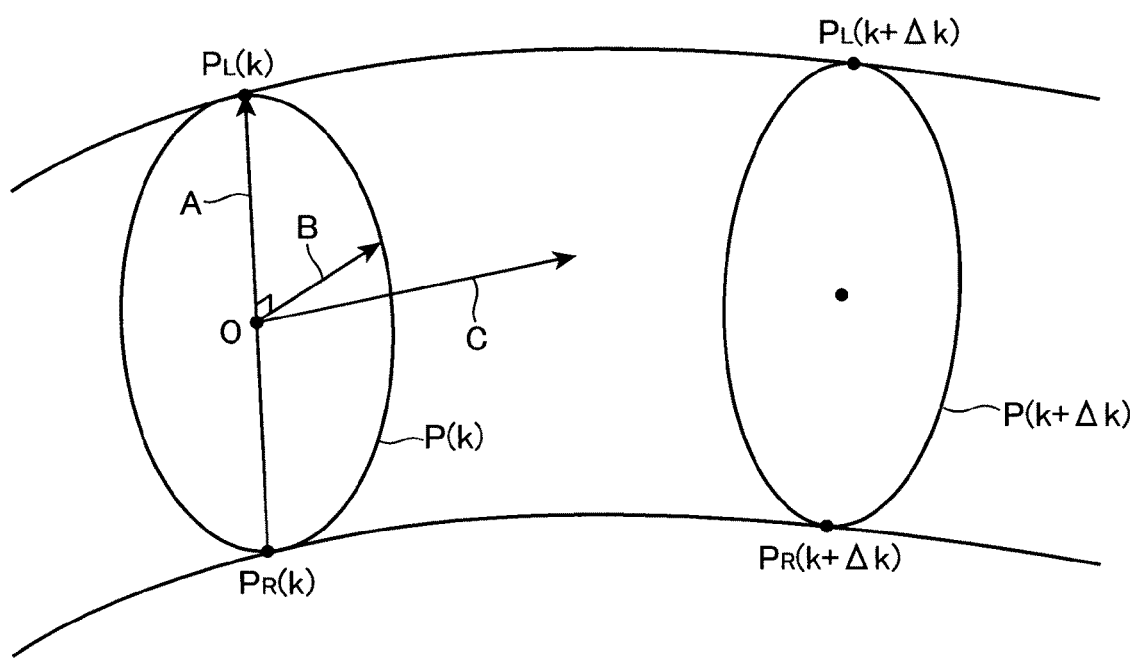
FIG. 31 is a view used to describe the calculation process of a yarn cross section sequence.

In Step S52 shown in FIG. 19, the solid model generating portion 14 finds a circle having a straight line linking the end points of the smoothed two yarn paths as a diameter to be the yarn cross section. To be more concrete, as is shown in FIG. 31, a circle having a diameter from $P_L(k)$ representing a given point on one of the two yarn paths to $P_R(k)$ representing a given point on the other yarn path where k is the same is found as the yarn cross section. Then, plural yarn cross sections are calculated by varying the value of k by a constant stride Δk to generate a yarn cross section sequence.

Herein, P(k) specifying one point on the circumference of the yarn cross section is expressed by Equation (13) below.

$$P(k) = \underbrace{\frac{P_L(k) - P_R(k)}{2}}_{A} \cos\theta + \underbrace{\frac{\frac{\{P_L(k) - P_R(k)\}'}{|P_L(k) - P_R(k)|} \times \frac{P_L(k) - P_R(k)}{2}}{C}}_{B} \sin\theta + \frac{P_L(k) - P_R(k)}{2} \quad (13)$$

Herein, the first term, $(P_L(k)-P_R(k))/2$, is a base vector A representing the radius of the yarn cross section as is shown in FIG. 31. The second term, $(P_L(k)-P_R(k))'/(P_L(k)-P_R(k))$, is a derivative value with respect to k of the unit vector in the diameter direction and represents the vector C that specifies the yarn direction. The coefficient of sin θ in the second term is the vector product of the vector C and the base vector A and represents a base vector B on the yarn cross section. θ is a variable used to express the circumference of the yarn cross section using the base vectors A and B. The third term, $(P_L(k)+P_R(k))/2$, represents the center O of the yarn cross section.

In Step S53 shown in FIG. 19, the solid model generating portion 14 connects the circumferences in the yarn cross section sequence with polygons and sets the circumferential surface of the yarn into the solid knitting structure model.

Figure 32:
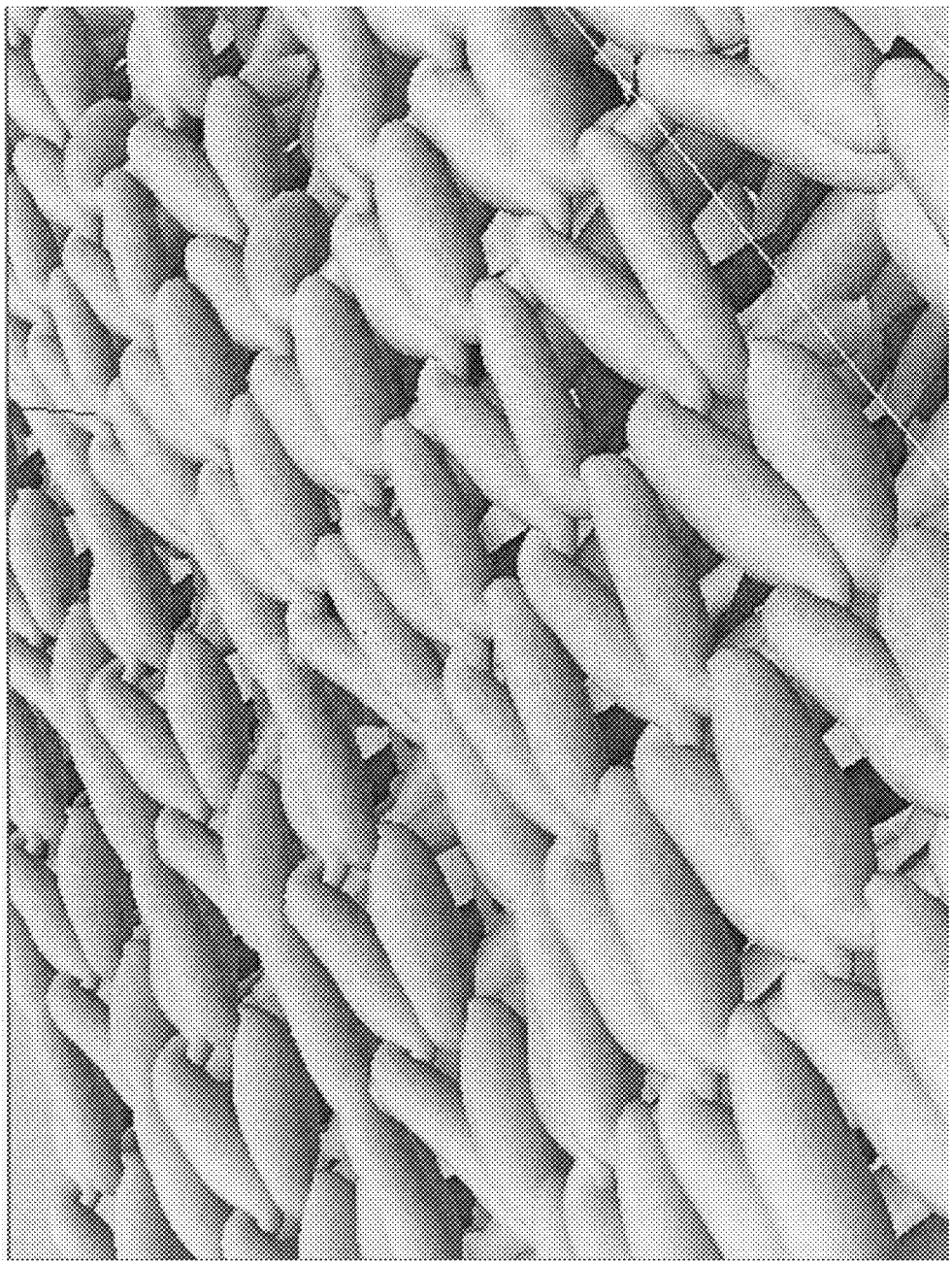
FIG. 32 is a view showing a rendering result of the solid knitting structure model.

FIG. 32 is a view showing the rendering result of the solid knitting structure model generated by the solid model generating portion 14. It is understood that, as is shown in FIG. 32, a myriad of yarns are knitted according to the knitting patterns.

Figure 33:
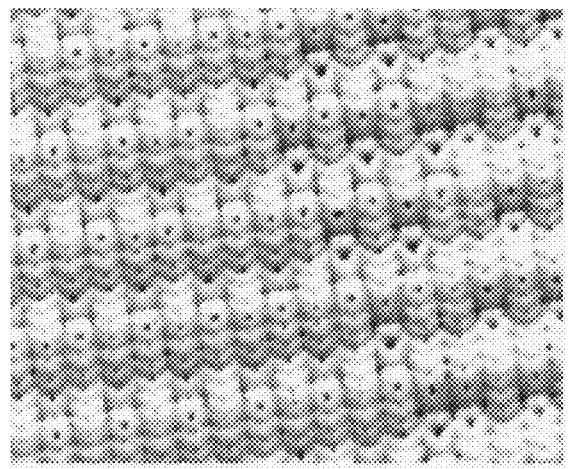
FIG. 33 is a view showing a solid knitting structure model when the knitting structure model shown in FIG. 32 is shown in a reduced scale.
Figure 34:
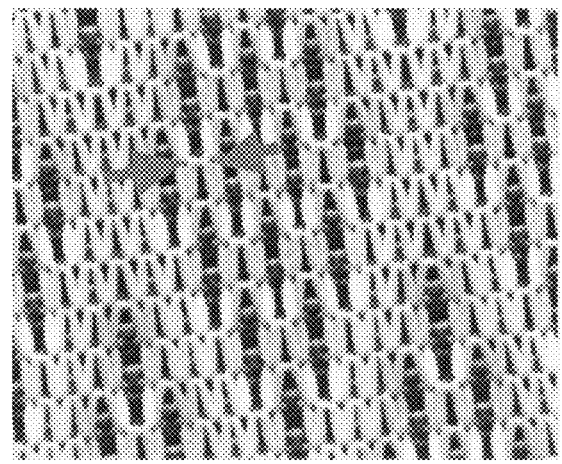
FIG. 34 is a view showing a rendering result of a solid knitting structure model including the knitting pattern of a tuck.

FIG. 33 is a view showing the solid knitting structure model when the knitting structure model shown in FIG. 32 is shown in a reduced scale. It is understood that, as is shown in FIG. 33, a realistic solid knitting structure model is generated by carrying out the processing described above. FIG. 34 is a view showing the rendering result of the solid knitting structure model including the knitting pattern of the tuck. It is understood that, as is shown in FIG. 34, because two yarns are connected at the first node N1 and the second node N2 according to the knitting pattern of the tuck, a force that narrows the width between the first node N1 and the second node N2 is induced as is indicated by arrows, which consequently generates a solid knitting structure model having many pores.

As has been described, according to the knitting structure model generating device, the simplified knitting structure model is generated by acquiring the knitting structure data of yarns and connecting the nodes aligned within the XY plane according to the knitting structure data with the edges corresponding to yarns and displayed on the display portion 40.

It thus becomes possible to acquire the simplified knitting structure model in which the knitting structure data is expressed by the edges and nodes. The user who views the knitting structure model can therefore easily imagine what type of knit fabric will be knitted.

In addition, a solid knitting structure model of the knit fabric is generated by solving the motion equation for each node on the assumption that each node is a mass point of the knit fabric by letting stress corresponding to the kinds of the edges connected to each node act and applying a specific external force on each node. It is therefore possible to obtain the solid knitting structure model that includes and considers the mechanical characteristic of the knit fabric.

The embodiment above is configured in such a manner that the simplified knitting structure is displayed on the display portion 40. It should be appreciated, however, that the invention is not limited to this configuration. The simplified knitting structure model may be printed on a recoding sheet using output means, such as a printer. Also, a knit fabric of double sided knitting is adopted in the embodiment above. The invention, however, is not limited to this example, and the invention is also applicable to a knit fabric of single side knitting.

In addition, the embodiment above described that the lower knit K is adjacent to the tuck T of interest in FIG. 13 and other relevant drawings. However, the lower knit K is not necessarily an adjacent node and a knit positioned in the same column and on the lower side of the tuck T of interest may be adopted as the lower knit.

(1) A computer-readable recording medium which stores a knitting structure model generating program according to one aspect of the invention is a knitting structure model generating program for generating a knitting structure model of a knit fabric within a virtual three-dimensional space, said program causing a computer to function as at least: knitting structure data acquiring means for acquiring knitting structure data in which a knitting structure of the knit fabric is represented by symbols corresponding to knitting patterns making up the knitting structure; node aligning means for aligning nodes representing connecting points of yarns forming the knit fabric in a lattice form on a specific plane within the virtual three-dimensional space; and simplified model generating means for generating a simplified knitting structure model that represents the knit fabric in a simplified manner by connecting the nodes aligned within the virtual three-dimensional space with edges corresponding to the yarns according to the knitting structure data acquired by the knitting structure data acquiring means.

A knitting structure model generating device according to second aspect of the invention is a knitting structure model generating device that generates a knitting structure model of a knit fabric within a virtual three-dimensional space, including: a knitting structure data acquiring portion for acquiring knitting structure data in which a knitting structure of the knit fabric is represented by symbols corresponding to knitting patterns making up the knitting structure; node aligning portion for aligning nodes representing connecting points of yarns forming the knit fabric in a lattice form on a specific plane within the virtual three-dimensional space; and a simplified model generating portion for generating a simplified knitting structure model by connecting the nodes aligned within the virtual three-dimensional space with edges corresponding to the yarns according to the knitting structure data acquired by the knitting structure data acquiring portion.

A knitting structure model generating method according to third aspect of the invention is a knitting structure model generating method of generating a knitting structure model of a knit fabric within a virtual three-dimensional space, said method comprising the steps of: obtaining knitting structure data by a computer in which a knitting structure of the knit fabric is represented by symbols corresponding to knitting patterns making up the knitting structure; aligning by the computer nodes representing connecting points of yarns forming the knit fabric in a lattice form on a specific plane within the virtual three-dimensional space; and a simplified knitting structure model by connecting the nodes aligned within the virtual three-dimensional space with edges representing connection relations among the nodes according to the knitting structure data that has been acquired.

According to these configurations, a simplified knitting structure model is generated by obtaining the knitting structure data in which the knitting patterns are represented by specific symbols and connecting the nodes aligned within the specific plane in the virtual three-dimensional space with the edges corresponding to the yarns according to the knitting structure data.

Accordingly, it is possible to obtain the simplified knitting structure model that expresses the knitting structure data by the edges and the nodes. The user who views the simplified knitting structure model can therefore easily imagine what type of knit fabric will be knitted.

(2) Also, in the configurations described above, it is preferable that: the knitting structure data has a data structure in which the symbols corresponding to the knitting patterns are aligned in a matrix fashion; the node aligning means allocates four nodes adjacent to each other in a lattice form to each symbol; the four nodes allocated to each symbol includes a first node positioned on an upper left, a second node positioned on an upper right, a third node positioned on a lower left, and a fourth node positioned on a lower right; and the third and fourth nodes allocated to a symbol of interest, which is one symbol to be of interest among the symbols representing the knitting patterns making up the knitting structure data, are common, respectively, with the first and second nodes allocated to another symbol present adjacently on a lower side of the symbol of interest.

According to this configuration, the first through fourth nodes that are positioned adjacently on the upper left, the upper right, the lower left, and the lower right in a lattice form are allocated to each symbol. The respective nodes are aligned in such a manner that the third and fourth nodes allocated to a given symbol are common, respectively, with the first and second nodes allocated to another symbol present adjacently on the lower side of the firstly-mentioned symbol. Accordingly, for example, when two edges are connected to a node, it is possible to express that two yarns are connected to this node.

(3) Also, in the configurations described above, it is preferable that the knitting structure data includes a knitting pattern of a knit, and that the simplified model generating means generates the simplified knitting structure model by connecting the nodes adjacent to each other in a longitudinal direction and in a lateral direction with the edges.

According to this configuration, it is possible to generate a simplified knitting structure model from which an individual can easily imagine the knitting structure of the knit fabric including the knitting pattern of the knit.

(4) Also, in the configurations described above, it is preferable that: the knitting structure data includes knitting patterns of a knit and a tuck and a left knit symbol representing the knitting pattern of the knit is present adjacently on a left side of a tuck symbol of interest, which is one tuck symbol to be of interest among the knitting patterns making up the knitting structure data, a right knit symbol representing the knitting pattern of the knit is present adjacently on a right side of the tuck symbol of interest, and a lower knit symbol representing the knitting pattern of the knit is present on a lower side of the tuck symbol of interest, and that the simplified model generating means carries out processing as follows using the symbol of each tuck as the tuck symbol of interest: connecting the nodes present adjacently to each other in a longitudinal direction and in a lateral direction with the edges; deleting the third and fourth nodes allocated to the tuck symbol of interest and the edges connected to the third and fourth nodes; connecting the first node and the second node allocated to the tuck symbol of interest with two edges; connecting the first node allocated to the tuck symbol of interest and the third node allocated to the symbol of the lower knit with the edge and connecting the second node allocated to the tuck symbol of interest and the fourth node allocated to the lower knit symbol with the edge; and connecting the fourth node allocated to the left knit symbol and the first node allocated to the tuck symbol of interest with the edge and connecting the third node allocated to the right knit symbol and the second node allocated to the tuck symbol of interest with the edge.

According to this configuration, it is possible to generate a simplified knitting structure model from which an individual can easily imagine the knitting structure of the knit fabric including the knitting pattern of the tuck and the knitting pattern of the knit.

(5) Also, in the configurations described above, it is preferable that the edges include a first edge representing first stress acting on each node and a second edge representing second stress weaker than the first stress, the knitting structure data includes knitting patterns of a knit and a welt, and a lower knit symbol representing the knitting pattern of the knit is present adjacently on a lower side of a welt symbol of interest, which is one welt symbol to be of interest among the symbols making up the knitting structure data, and that the simplified model generating means carries out processing as follows using each welt symbol as the welt symbol of interest: connecting the nodes present adjacently to each other in a longitudinal direction and in a lateral direction with the first edges; deleting the first edges connecting the first and third nodes as well as the second and fourth nodes allocated to the welt symbol of interest, and deleting the first edges connecting the first and third nodes as well as the second and fourth nodes allocated to the lower knit symbol; connecting the first and third nodes allocated to the welt symbol of interest with the second edge and connecting the second and fourth nodes allocated to the welt symbol of interest with the second edge; connecting the first and third nodes allocated to the lower knit symbol with the second edge and connecting the second and fourth nodes allocated to the lower knit symbol with the second edge; and connecting the first node allocated to the welt symbol of interest and the third node allocated to the lower knit symbol with the first edge and connecting the second node allocated to the welt symbol of interest and the fourth node allocated to the lower knit symbol with the first edge.

According to this configuration, it is possible to generate a simplified knitting structure model from which an individual can easily imagine the knitting structure of the knit fabric including the knitting pattern of the welt and the knitting pattern of the knit.

(6) Also, in the configurations described above, it is preferable that the simplified model generating means generates the simplified knitting structure model by connecting each node positioned on a left end and a node positioned on a right end in a same row and connecting each node positioned on an upper end and a node positioned on a lower end in a same column.

According to this configuration, in a knit fabric in which the knitting structure made up of certain knitting patterns is combined repetitively, it is possible to hold the data of the knitting structure model by merely holding the data of the knitting structure model made up of the certain knitting patterns without having to hold the data of the entire region.

(7) Also, in the configurations described above, it is preferable that the nodes represent mass points of the knit fabric; the edges represent stress acting on the mass points; and the knitting structure model generating program causes the computer to function further as solid model generating means for generating a solid knitting structure model by solving a motion equation of each node by finding stress acting on each node on a basis of the edges making up the simplified knitting structure model generated by the simplified model generating means and applying a specific external force on each node in a direction crossing an alignment plane of each node.

According to this configuration, the solid knitting structure model of the knit fabric is generated by solving the motion equation of each node on the assumption that each node is the mass point of the knit fabric by letting stress corresponding to the kinds of the edges connected to each node act and applying a specific external force on each node. It is thus possible to obtain the solid knitting structure model that includes and considers the mechanical characteristic of the knit fabric. Herein, because the specific external force acts in a direction crossing the alignment plane of the node, the node is allowed to move with ease in the direction crossing the alignment plane, which makes it possible to express the knitting patterns of yarns better in a solid form.

(8) Also, in the configurations described above, it is preferable that the knit fabric is a knit fabric of double sided knitting formed of a front and a back, and that the solid model generating means causes a repulsive force, which is inversely proportional to a distance to the front and a distance to the back from each of the third and fourth nodes allocated to a symbol of a welt, to act on each of the third and fourth nodes as the external force.

According to this configuration, it is possible to generate the solid knitting structure model that includes and considers a repulsive force inducted between yarns crossing each other for the knitting pattern of the welt.

(9) Also, in the configurations described above, it is preferable that the solid model generating means sets two circles having different radii at each node concentrically, and sets two lines smoothly connecting the two circles set at a node of interest and the two circles set at another node connected to the node of interest with the edge as yarn paths.

According to this configuration, two circles having different radii are set concentrically at each node and lines smoothly linking the two circles set at the node of interest and the two circles set at another node connected to the node of interest with the edges are set as yarn paths. It is thus possible to generate the solid knitting structure model in which yarns bend smoothly at each node.

(10) Also, in the configurations described above, it is preferable that the solid model generating means smoothes the yarn paths by subtracting a first-order term when an original function representing each yarn path is expanded by a Fourier series from the original function, expanding a function after subtraction by a Fourier series to a specific lower-order term, and adding the first-order term.

According to this configuration, the first-order term is subtracted from the original function, and the function after subtraction is expanded by a Fourier series to a lower-order term, after which the first-order term is added. It is thus possible to set smoother yarns to the solid knitting structure model while maintaining continuity.

(11) A computer-readable recording medium which stores a knitting structure model generating program according to fourth aspect of the invention is a knitting structure model generating program for generating a knitting structure model of a knit fabric within a virtual three-dimensional space, causing a computer to function as at least: simplified model obtaining means for obtaining a simplified knitting structure model in which nodes representing connecting points of yarns forming the knit fabric are aligned in a lattice form on a specific plane within the virtual three-dimensional space and the respective nodes are connected with edges corresponding to the yarns; and solid model generating means for generating a solid knitting structure model by solving a motion equation of each node by finding stress acting on each node making up the simplified knitting structure model on a basis of the edges making up the simplified knitting structure model obtained by the simplified knitting structure model obtaining means and applying a specific external force on each node in a direction crossing an alignment plane of each node.

A knitting structure model generating device according to fifth aspect of the invention is a knitting structure model generating device that generates a knitting structure model of a knit fabric within a virtual three-dimensional space, including: a simplified model obtaining portion for obtaining a simplified knitting structure model in which nodes representing connecting points of yarns forming the knit fabric are aligned in a lattice form on a specific plane within the virtual three-dimensional space and the respective nodes are connected with edges corresponding to the yarns; and a solid model generating portion for generating a solid knitting structure model by solving a motion equation of each node by finding stress acting on each node on a basis of the edges making up the simplified knitting structure model obtained by the simplified knitting structure model obtaining portion and applying a specific external force on each node in a direction crossing an alignment plane of each node.

A knitting structure model generating method according to sixth aspect of the invention is a knitting structure model generating method of generating a knitting structure model of a knit fabric within a virtual three-dimensional space, said method comprising the steps of: obtaining by a computer a simplified knitting structure model, in which nodes representing connecting points of yarns forming the knit fabric are aligned in a lattice form on a specific plane within the virtual three-dimensional space and the respective nodes are connected with edges corresponding to the yarns; and generating by the computer a solid knitting structure model by solving a motion equation acting on each node by finding stress acting on each node of the simplified knitting structure model on a basis of the edges making up the simplified knitting structure model obtaining means and applying a specific external force on each node in a direction crossing an alignment plane of each node.

According to these configurations, the solid knitting structure model of the knit fabric is generated by solving the motion equation of each node on the assumption that each node is the mass point of the knit fabric by letting stress corresponding to the kinds of the edges connected to each node act and applying a specific external force on each node. It is thus possible to obtain the solid knitting structure model that includes and considers the mechanical characteristic of the knit fabric. Herein, because the specific external force acts in a direction crossing the alignment plane of the node, the node is allowed to move with ease in the direction crossing the alignment plane, which makes it possible to express the knitting patterns of yarns better in a solid form.

The invention claimed is:

1. A computer-readable recording medium which stores a knitting structure model generating program for generating a knitting structure model of a knit fabric within a virtual three-dimensional space, said program causing a computer to function as at least:

knitting structure data acquiring means for acquiring knitting structure data in which a knitting structure of the knit fabric is represented by symbols corresponding to knitting patterns making up the knitting structure;

node aligning means for aligning nodes representing connecting points of yarns forming the knit fabric in a lattice form on a specific plane within the virtual three-dimensional space; and simplified model generating means for generating a simplified knitting structure model that represents the knit fabric in a simplified manner by connecting the nodes aligned within the virtual three-dimensional space with edges corresponding to the yarns according to the knitting structure data acquired by the knitting structure data acquiring means, wherein the simplified model generating means generates the simplified knitting structure model by connecting each node positioned on a left end and a node positioned on a right end in a same row and connecting each node positioned on an upper end and a node positioned on a lower end in a same column.

2. The computer-readable recording medium according to claim 1, wherein:

the knitting structure data has a data structure in which the symbols corresponding to the knitting patterns are aligned in a matrix fashion;

the node aligning means allocates four nodes adjacent to each other in a lattice form to each symbol;

the four nodes allocated to each symbol includes a first node positioned on an upper left, a second node positioned on an upper right, a third node positioned on a lower left, and a fourth node positioned on a lower right; and the third and fourth nodes allocated to a symbol of interest, which is one symbol to be of interest among the symbols representing the knitting patterns making up the knitting structure data, are common, respectively, with the first and second nodes allocated to another symbol present adjacently on a lower side of the symbol of interest.

3. The computer-readable recording medium according to claim 2, wherein:

the knitting structure data includes a knitting pattern of a knit; and the simplified model generating means generates the simplified knitting structure model by connecting the nodes adjacent to each other in a longitudinal direction and in a lateral direction with the edges.

4. The computer-readable recording medium according to claim 2, wherein:

the knitting structure data includes knitting patterns of a knit and a tuck; and a left knit symbol representing the knitting pattern of the knit is present adjacently on a left side of a tuck symbol of interest, which is one tuck symbol to be of interest among the knitting patterns making up the knitting structure data, a right knit symbol representing the knitting pattern of the knit is present adjacently on a right side of the tuck symbol of interest, and a lower knit symbol representing the knitting pattern of the knit is present on a lower side of the tuck symbol of interest, and wherein the simplified model generating means carries out processing as follows using the symbol of each tuck as the tuck symbol of interest:

connecting the nodes present adjacently to each other in a longitudinal direction and in a lateral direction with the edges;

deleting the third and fourth nodes allocated to the tuck symbol of interest and the edges connected to the third and fourth nodes;

connecting the first node and the second node allocated to the tuck symbol of interest with two edges;

connecting the first node allocated to the tuck symbol of interest and the third node allocated to the symbol of the lower knit with the edge and connecting the second node allocated to the tuck symbol of interest and the fourth node allocated to the lower knit symbol with the edge; and connecting the fourth node allocated to the left knit symbol and the first node allocated to the tuck symbol of interest with the edge and connecting the third node allocated to the right knit symbol and the second node allocated to the tuck symbol of interest with the edge.

5. The computer-readable recording medium according to claim 2, wherein:

the edges include a first edge representing first stress acting on each node and a second edge representing second stress weaker than the first stress;

the knitting structure data includes knitting patterns of a knit and a welt; and a lower knit symbol representing the knitting pattern of the knit is present adjacently on a lower side of a welt symbol of interest, which is one welt symbol to be of interest among the symbols making up the knitting structure data, and wherein the simplified model generating means carries out processing as follows using each welt symbol as the welt symbol of interest:

connecting the nodes present adjacently to each other in a longitudinal direction and in a lateral direction with the first edges;

deleting the first edges connecting the first and third nodes as well as the second and fourth nodes allocated to the welt symbol of interest, and deleting the first edges connecting the first and third nodes as well as the second and fourth nodes allocated to the lower knit symbol;

connecting the first and third nodes allocated to the welt symbol of interest with the second edge and connecting the second and fourth nodes allocated to the welt symbol of interest with the second edge;

connecting the first and third nodes allocated to the lower knit symbol with the second edge and connecting the second and fourth nodes allocated to the lower knit symbol with the second edge; and connecting the first node allocated to the welt symbol of interest and the third node allocated to the lower knit symbol with the first edge and connecting the second node allocated to the welt symbol of interest and the fourth node allocated to the lower knit symbol with the first edge.

6. A computer-readable recording medium which stores a knitting structure model generating program for generating a knitting structure model of a knit fabric within a virtual three-dimensional space, causing a computer to function as at least:

simplified model obtaining means for obtaining a simplified knitting structure model in which nodes representing connecting points of yarns forming the knit fabric are aligned in a lattice form on a specific plane within the virtual three-dimensional space and the respective nodes are connected with edges corresponding to the yarns; and solid model generating means for generating a solid knitting structure model by solving a motion equation of each node by finding stress acting on each node making up the simplified knitting structure model on a basis of the edges making up the simplified knitting structure model obtained by the simplified knitting structure model obtaining means and applying a specific external force on each node in a direction crossing an alignment plane of each node, wherein the solid model generating means sets two circles having different radii at each node concentrically, and sets two lines smoothly connecting the two circles set at a node of interest and the two circles set at another node connected to the node of interest with the edge as yarn paths.

7. The computer-readable recording medium according to claim 1 wherein:

the nodes represent mass points of the knit fabric;

the edges represent stress acting on the mass points; and the knitting structure model generating program causes the computer to function further as solid model generating means for generating a solid knitting structure model by solving a motion equation of each node by the simplified knitting structure model generating means by finding stress acting on each node making up the simplified knitting structure model on a basis of the edges making up the simplified knitting structure model generated by the simplified model generating means and applying a specific external force on each node in a direction crossing an alignment plane of each node.

8. The computer-readable recording medium according to claim 6, wherein:

the knit fabric is a knit fabric of double sided knitting formed of a front and a back; and the solid model generating means causes a repulsive force, which is inversely proportional to a distance to the front and a distance to the back from each of the third and fourth nodes allocated to a symbol of a welt, to act on each of the third and fourth nodes as the external force.

9. The computer-readable recording medium according to claim 6, wherein:

the solid model generating means smoothes the yarn paths by subtracting a first-order term when an original function representing each yarn path is expanded by a Fourier series from the original function, expanding a function after subtraction by a Fourier series to a specific lower-order term, and adding the first-order term.

10. A knitting structure model generating device that generates a knitting structure model of a knit fabric within a virtual three-dimensional space, comprising:

a knitting structure data acquiring portion for acquiring knitting structure data in which a knitting structure of the knit fabric is represented by symbols corresponding to knitting patterns making up the knitting structure;

a node aligning portion for aligning nodes representing connecting points of yarns forming the knit fabric in a lattice form on a specific plane within the virtual three-dimensional space; and a simplified model generating portion for generating a simplified knitting structure model by connecting the nodes aligned within the virtual three-dimensional space with edges corresponding to the yarns according to the knitting structure data acquired by the knitting structure data acquiring portion, wherein the simplified model generating means generates the simplified knitting structure model by connecting each node positioned on a left end and a node positioned on a right end in a same row and connecting each node positioned on an upper end and a node positioned on a lower end in a same column.

11. A knitting structure model generating method of generating a knitting structure model of a knit fabric within a virtual three-dimensional space, said method comprising the steps of:

obtaining knitting structure data by a computer in which a knitting structure of the knit fabric is represented by symbols corresponding to knitting patterns making up the knitting structure;

aligning by the computer nodes representing connecting points of yarns forming the knit fabric in a lattice form on a specific plane within the virtual three-dimensional space; and generating by the computer a simplified knitting structure model by connecting the nodes aligned within the virtual three-dimensional space with edges representing connection relations among the nodes according to the knitting structure data that has been acquired, wherein the computer is operative to generate the simplified knitting structure model by connecting each node positioned on a left end and a node positioned on a right end in a same row and connecting each node positioned on an upper end and a node positioned on a lower end in a same column.

12. A knitting structure model generating device that generates a knitting structure model of a knit fabric within a virtual three-dimensional space, comprising:

a simplified model obtaining portion for obtaining a simplified knitting structure model in which nodes representing connecting points of yarns forming the knit fabric are aligned in a lattice form on a specific plane within the virtual three-dimensional space and the respective nodes are connected with edges corresponding to the yarns; and a solid model generating portion for generating a solid knitting structure model by solving a motion equation of each node by finding stress acting on each node on a basis of the edges making up the simplified knitting structure model obtained by the simplified knitting structure model obtaining portion and applying a specific external force on each node in a direction crossing an alignment plane of each node, wherein the solid model generating means sets two circles having different radii at each node concentrically, and sets two lines smoothly connecting the two circles set at a node of interest and the two circles set at another node connected to the node of interest with the edge as yarn paths.

13. A knitting structure model generating method of generating a knitting structure model of a knit fabric within a virtual three-dimensional space, said method comprising the steps of:

obtaining a simplified knitting structure model by a computer, in which nodes representing connecting points of yarns forming the knit fabric are aligned in a lattice form on a specific plane within the virtual three-dimensional space and the respective nodes are connected with edges corresponding to the yarns; and generating a solid knitting structure model the computer by solving a motion equation acting on each node by finding stress acting on each node of the simplified knitting structure model on a basis of the edges making up the simplified knitting structure model and applying a specific external force on each node in a direction crossing an alignment plane of each node, wherein the computer is operative to set two circles having different radii at each node concentrically, and set two lines smoothly connecting the two circles set at a node of interest and the two circles set at another node connected to the node of interest with the edge as yarn paths.

* * * * *